(12) United States Patent
Fulbright

(10) Patent No.: US 6,233,802 B1
(45) Date of Patent: May 22, 2001

(54) LOW SWAGE LOAD FASTENER AND FASTENING SYSTEM

(75) Inventor: David J. Fulbright, Waco, TX (US)

(73) Assignee: Huck International, Inc., Tucson, AZ (US)

( * ) Notice: Subject to any disclaimer, the term of this patent is extended or adjusted under 35 U.S.C. 154(b) by 0 days.

(21) Appl. No.: 09/369,727

(22) Filed: Aug. 6, 1999

(51) Int. Cl.[7] ............................. F16B 19/08; B21J 15/00
(52) U.S. Cl. ...................... 29/243.519; 29/715; 411/361
(58) Field of Search .................. 29/517, 520, 525.2, 29/407, 456, 715; 411/43, 69, 70, 360, 361, 515, 520

(56) References Cited

U.S. PATENT DOCUMENTS

| | | |
|---|---|---|
| 2,531,048 | 11/1950 | Huck . |
| 2,531,049 | 11/1950 | Huck . |
| 2,804,798 | 9/1957 | Brilmyer . |
| 3,057,246 | 10/1962 | Brilmyer . |
| 3,066,568 | 12/1962 | Armour . |
| 3,122,050 | 2/1964 | Wenson . |
| 3,215,024 | 11/1965 | Brilmyer et al. . |
| 3,290,982 | 12/1966 | Marschner . |
| 3,415,553 | 12/1968 | Baugh . |
| 3,425,259 | 2/1969 | Baugh . |
| 3,915,053 | 10/1975 | Ruhl . |
| 4,136,596 | 1/1979 | Davis, Jr. . |
| 4,198,895 | 4/1980 | Ruhl . |
| 4,221,152 | 9/1980 | Jason . |
| 4,299,519 | 11/1981 | Corbett . |
| 4,472,096 | 9/1984 | Ruhl et al. . |
| 4,587,829 | 5/1986 | Sukharevsky . |
| 4,597,263 | 7/1986 | Corbett . |
| 4,813,834 | 3/1989 | Smith . |
| 4,867,625 | 9/1989 | Dixon . |
| 4,878,372 | 11/1989 | Port et al. . |
| 4,921,384 | 5/1990 | Nordyke . |
| 4,943,196 | 7/1990 | Dahl . |
| 5,090,852 | 2/1992 | Dixon . |
| 5,125,778 | 6/1992 | Sadri . |
| 5,315,755 | 5/1994 | Fulbright et al. . |

Primary Examiner—David Jones
(74) Attorney, Agent, or Firm—Harness Dickey & Pierce PLC

(57) ABSTRACT

A fastening system including a two piece swage type fastener including a pin and a collar in which the pin has relatively wide lock grooves and in which the lock grooves have a generally smooth root contour with the collar having a shank portion with a wall thickness defining an excess volume of material prior to swage greater than the volume of the confronting lock grooves and with the clearance between the inside diameter of the collar shank portion and the diameter of crests of the lock grooves being a minimum to reduce the compressive force required to swage the collar shank into the lock grooves and with the excess volume of collar shank material providing only a partial fill of the lock grooves upon swage.

37 Claims, 14 Drawing Sheets

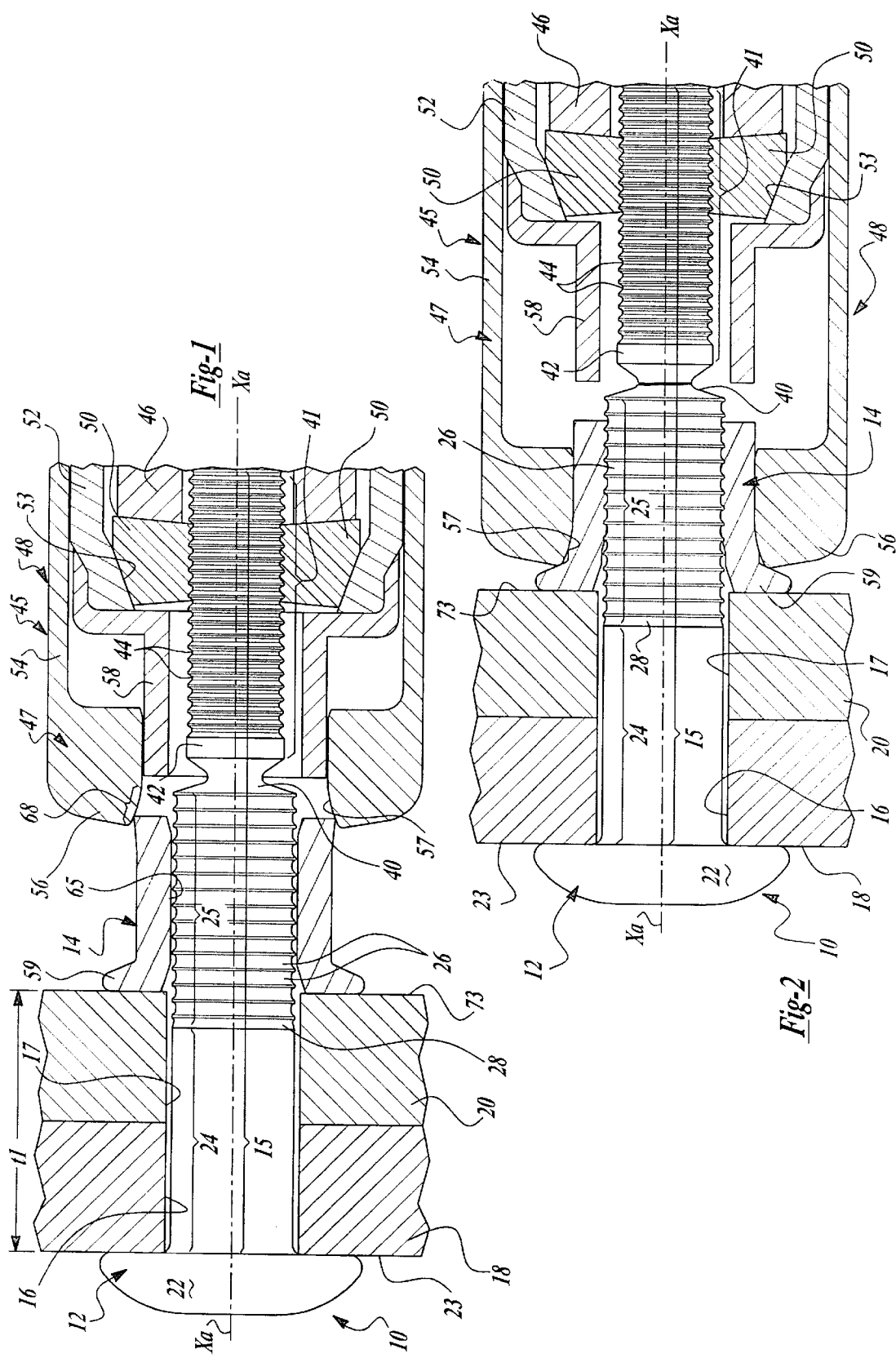

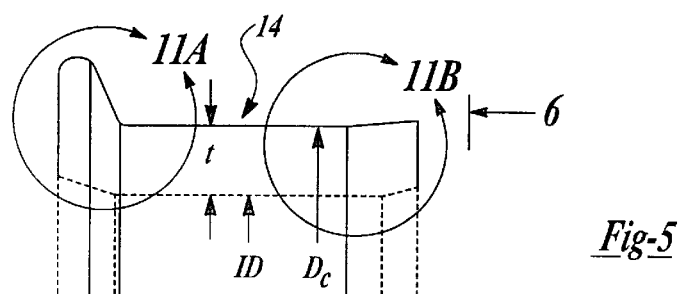
*Fig-5*
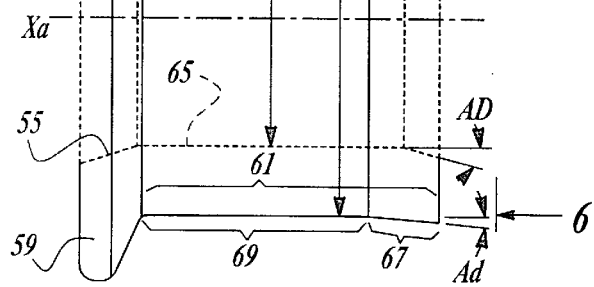
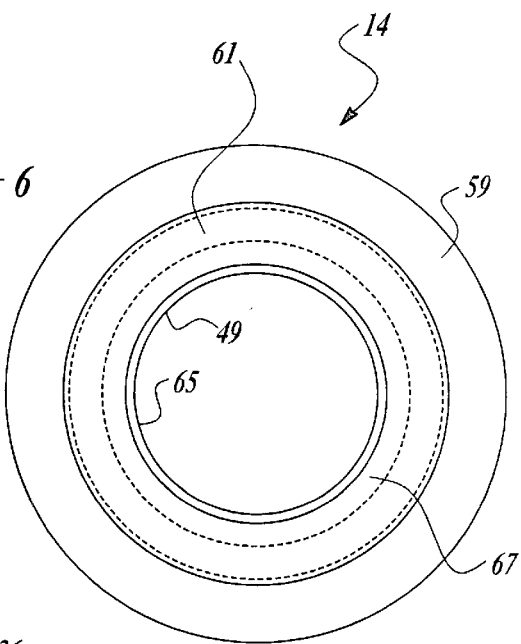
*Fig-6*
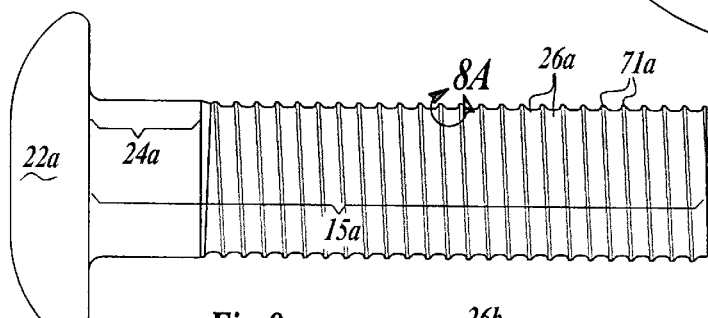
*Fig-8*
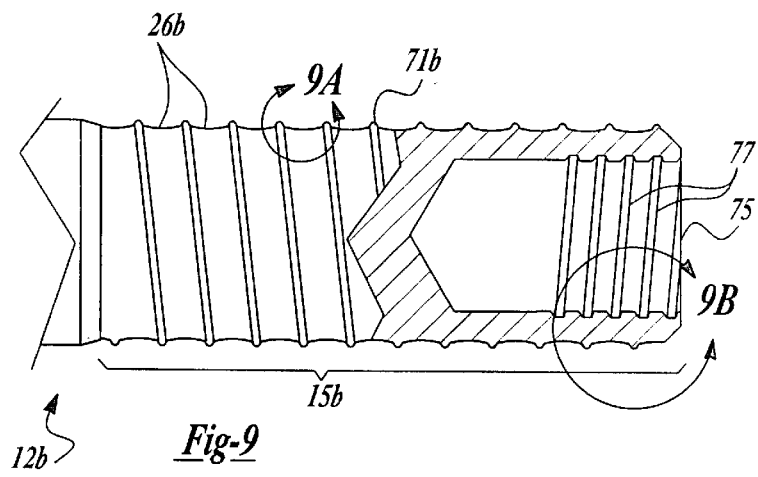
*Fig-9*

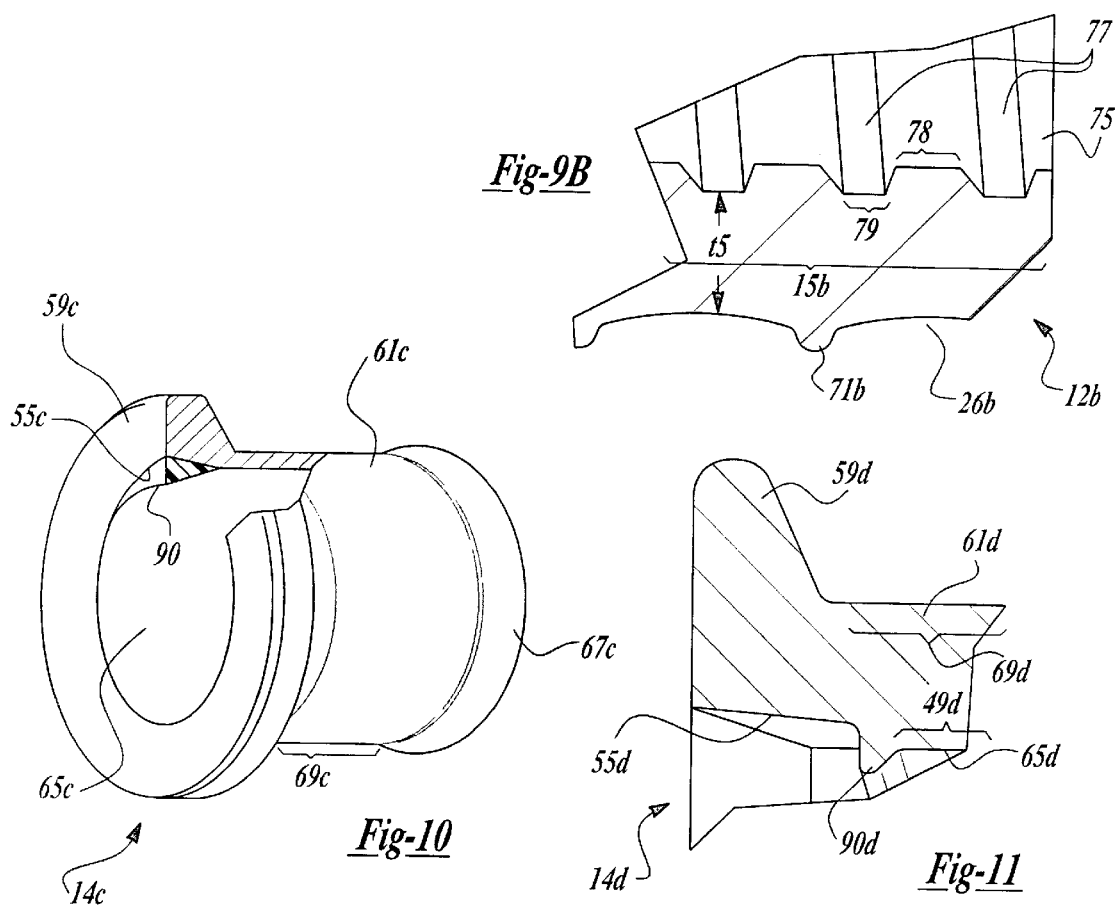
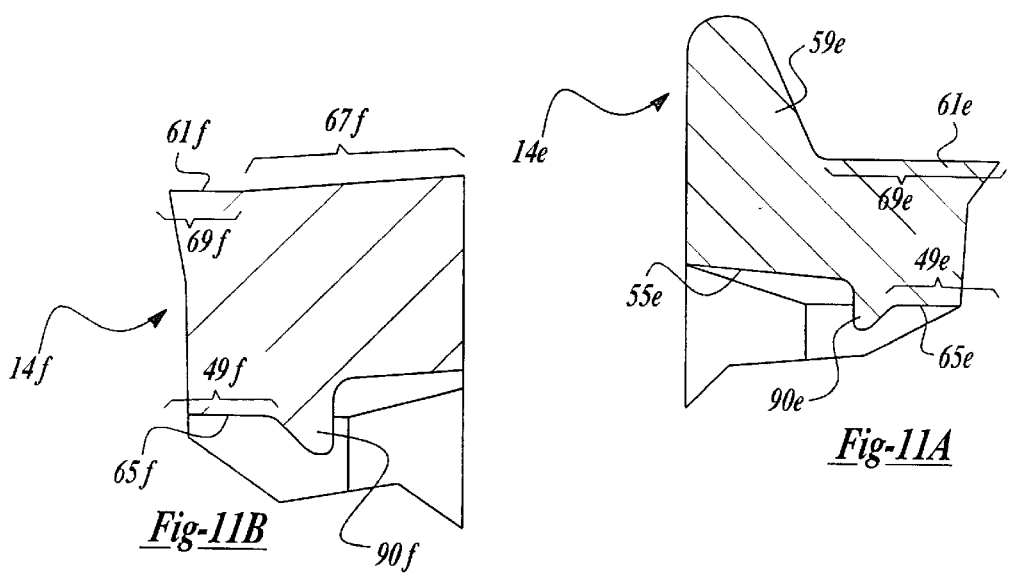

LOW SWAGE LOAD FASTENER AND FASTENING SYSTEM

SUMMARY BACKGROUND OF THE INVENTION

The present invention relates to a fastening system including two-piece swage fasteners and more particularly to pull type swage fasteners with the present invention directed to a construction in which the tensile or relative axial loads required to swage the fastener are reduced permitting the use of smaller, lighter weight installation tools while providing a fastener having a preselected strength and a desirable weight and size.

The present invention relates to two-piece swage type fasteners or lockbolts generally of the type illustrated in U.S. Pat. No. 2,531,048 to L. Huck, issued Nov. 21, 1950, and U.S. Pat. No. 3,215,024 to Brilmyer et al issued Nov. 2, 1965; there are numerous other variations of swage type fasteners such as U.S. Pat. No. 3,915,053 to J. Ruhl, issued Oct. 28, 1975, U.S. Pat. No. 4,472,096 to J. Ruhl and R. Dixon, issued on Sep. 18, 1984 and U.S. Pat. No. 5,090,852 to R. Dixon, issued Feb. 25, 1992.

In many commercial applications, two-piece threaded or swaged fasteners are used and are designated by a grade indicative of a particular strength level. For example, a 5/8 inch Grade 5 fastener will have a 5/8 inch diameter pin or bolt shank portion for use in a nominal 5/8 inch diameter workpiece opening and will have a strength level indicated by the grade level, i.e. Grade 5. A Grade 8 bolt, on the other hand, will have higher strength characteristics than the Grade 5 bolt while a Grade 9 bolt will have even higher strength characteristics. For example the strength of a Grade 5 fastener is determined by the strength of the material of the bolt or pin as set by SAE J429 or ASTM A-325 with a minimum material tensile strength of 120 KSI while a Grade 8 is set by SAE J429 or ASTM A-490 at 150 KSI.

A typical swage type fastener includes a pin and a collar with the pull type fastener having a pin shank having a locking portion with lock grooves and a pull portion with pull grooves. The pull grooves are adapted to be gripped by matching teeth in chuck jaws of an installation tool having a swage anvil adapted to engage the collar whereby a relative axial force can be applied between the pin and collar to move the anvil over the collar to swage it into the lock grooves. Here the relative axial force is a tensile load on the pin via the chuck jaws and a compressive load on the collar via the tool swage anvil.

In many swage fasteners the pull portion is connected to the lock groove portion by a breakneck groove of reduced strength which is adapted to fracture at a preselected magnitude of axial or tensile force greater than that required to swage the collar whereby the pull portion, or pintail, will be severed and removed from the pin shank after completion of swaging. Other swage fasteners, however, have pull portions which remain on the pin after completion of installation. See for example U.S. Pat. No. 5,315,755 to Fulbright et al, issued May 31, 1994 where a threaded pull portion is utilized which is not severed from the pin.

In many instances, with swage fasteners of relatively high strength, in order to fully swage the collar the magnitude of applied tensile load can be quite high requiring an installation tool of relatively large size and weight. This is especially significant where manually operated installation tools are used. Such tools typically include hydraulic and/or pneumatic piston-cylinder constructions the size and weight of which will vary with the necessary magnitude of tensile load to be applied. Such tools can be of the type shown in U.S. Pat. No. 4,597,263 to R. Corbett issued Jul. 1, 1986 and U.S. Pat. No. 4,878,372 issued Nov. 7, 1989 to Port et al.

In addition with fasteners including pins having the pull grooves on a severable pintail the breakneck groove must also be of sufficient strength to withstand the high tensile load for swaging and the pull grooves must be similarly of sufficient strength to accept the relative axial pull load applied by the engaged teeth of chuck jaws on the installation tool. This routinely requires that the pull portion be of a relatively large diameter so as to have sufficient material to provide the necessary size and strength for the breakneck groove and also to inhibit fracturing of the pull grooves instead of the breakneck groove. This also adds to the size and weight of the components of the tool to engage the pull grooves and to provide the tensile load on the pin for fracture of the breakneck groove.

In the present invention, a two-piece swage type fastener is provided which can be installed at a lower swage load than a conventional swage type fastener of comparable grade but when installed has the physical properties of essentially the same values such as tensile strength, clamp load and the like on the workpieces being connected. This permits the use of a smaller, lighter weight installation tool in comparison to similar swage type fasteners having the same Grade capability for providing similar physical properties. At the same time with pins having a severable pintail, the breakneck groove and pull grooves can be correspondingly reduced in strength. This permits the pull portion or pintail of the pin shank to be reduced in diameter thus reducing the amount of metal in the pin and at the same time reducing the weight and material cost. The reduced diameter pintail also facilitates the manufacture of the lower strength breakneck groove by roll forming.

However, with pull type swage fasteners having threaded pull portions which are not severed, as in the '755 patent, supra, the present invention facilitates the engagement of fewer threads on the pull portion since the extra force required to fracture a breakneck is not required. This causes less stress on the engaged threads of the mating threaded thimble or nut member on the pull tool resulting in longer life. This also permits the use of a shorter, less expensive pin since less pin protrusion is required for the fewer pull grooves to be gripped. Also the installation tool can be smaller and hence lighter and less expensive since lower applied loads are required for final installation. This also facilitates the use of an internal drive of the type illustrated in FIGS. 17 and 18 of the '755 patent which as shown involves the use of a threaded pull rod or spindle engageable with pull grooves provided by a threaded bore in the end of the shank of the pin or bolt. The use of an internal drive will permit a reduction in protrusion relative to the external drive thereby providing for a more efficient final fit and appearance.

One form of a conventional swage type fastener is shown herein in FIGS. 7 and 7A. This type of fastener is used primarily in industrial applications such as buildings, bridges, trucks and the like. Such fastener also requires the application of a relatively high axial force for swaging and for final installation and accordingly requires a relatively large and heavy installation tool. Thus, in the present invention, the swage type fastener which comprises a pin and a collar is for use in applications similar to that of the fastener of FIGS. 7, 7A but, in contrast, the pin and collar are adapted to be set at a relatively low axial force and with a substantially smaller and lighter weight tool.

In one form of the invention the lock grooves in the pin are constructed to have wide or elongated roots which are of a simulated streamlined shape generally as shown in the '852 patent (supra). The crests of the shoulders of the lock grooves are contoured to facilitate the flow of the collar material as it is swaged to reduce the magnitude of tensile or swage load required to swage. Also the lock grooves are substantially wide relative to the width of adjacent crests which further promotes the flow of collar material during swage. As will be seen, however, the overall structure and operation of the fastener of the present invention is substantially different from that of the '852 patent and its commercial form. In this regard, and as previously noted, the fastener of the present invention is primarily designed for use in applications such as those of the conventional form shown in FIG. 7 which are lower strength and require lower installation loads than those of the fastener of the '852 patent. Thus the collar of the present invention is provided with a predetermined wall thickness, and hence volume, not only to provide a preselected amount of fill of the roots of the lock grooves during swaging but also to provide a retained clamp load or force having a magnitude which is considerably higher than the installation load. In this regard, unlike the fasteners of the '852 patent, the amount of fill of the lock grooves by the swaged collar, while substantial, is less than complete leaving a desired clearance at the base of the roots; this acts to prevent compression of the collar material against the root during swaging and thereby assists in minimizing the required installation loads. In addition the diameter of the collar bore is minimized to provide a relatively close clearance fit with the crests of the lock grooves of the pin and at the same time the outside collar diameter is selected to provide a selected, desirable volume of the swageable portion of the collar. The preceding features are significant in facilitating swaging of the collar material into the wide lock grooves in the pin at a lower relative axial force. At the same time the subject fastener will provide clamp loads which are of a significantly higher magnitude than the installation loads whereas with the conventional or prior swage type fasteners the same magnitude of clamp loads require substantially higher installation loads.

In addition to the above, the swage cavity of the installation tool has a configuration which assists in providing swaging at reduced relative axial or installation loads. At the same time the engaged end of the collar shank is configured to cooperate with the swage cavity construction and compensate for the minimized clearance to provide a desired magnitude of resistance to initiation of swaging or snubbing resulting in a relatively high desired magnitude of initial hold-off load to provide sufficient pull together of the workpieces to eliminate any gap between them.

In one form of the present invention the pin lock grooves are of a substantially greater width than the width of the crests while the collar is no longer than that required by a collar for a comparable, conventional fastener such as shown in FIGS. 7, 7A to provide filling of sufficient grooves and resultant engagement of the appropriate number of pin and collar shoulders to provide the desired design tensile load. In this way, the number of pin crests per unit of length over which the collar is swaged is substantially reduced assisting in the minimization of the relative axial force or swage load for swaging. At the same time the large width and contour of the grooves facilitates flow of the collar material during swage.

With the present invention swage loads and thus the related relative axial loads required for swage have been reduced by at least around 25% to around 45% in comparison to prior pull type swage fasteners such as shown in FIGS. 7, 7A of comparable size and strength while providing fastened joints with substantially the same magnitude of final clamp load or force. In addition, in one form of the invention, the final magnitude of clamp load attainable can be around 1.5 to around 1.9 times the magnitude of the applied swage load whereas for fasteners of the same size and grade the prior conventional swage fasteners achieve a final clamp load or force around 1.2 to 1.3 times the swage load. Of further importance is that the installation tool can be substantially reduced in size and by around 45% in weight. With severable pintailed fasteners the final installation load requires some increase over the final swage load but here with the lower swage loads the fracture loads of the breakneck grooves can be reduced. The lower installation loads and reduced pin break load in addition to reduction in tool size and weight also results in substantially less shock load to the operator.

While the present invention is shown and described for pull type swage fasteners, it should be understood that there would be benefits of the low swage load fastener that would be realized by stump type swage fasteners which are generally installed by squeeze type tools. See for example the stump type fastener in FIG. 1 of the '096 patent, supra.

As previously noted the benefits for the swage type fasteners with non-severable threaded pull portions are additionally significant since the extra force or load for pin break is not required. In addition and in order to further enhance the strength of the threaded type pull grooves, a modified thread form has been provided which further reduces the number of threaded pull grooves that need to be engaged by the threaded thimble or nut member to sustain the necessary pulling force to attain the lower installation loads.

In addition, a unique system has been provided to facilitate the use of the internal drive noted resulting in certain additional advantages.

Also, in one form of the fastening system, a swage anvil having a unique swage cavity is provided which is especially useful with the form of the fastener having external combined helical lock and pull grooves and the fastener having the internal pull grooves. Here the swage cavity not only facilitates swaging but also assists in removal from the collar over the portion of the collar which tends to spring back after swage.

Thus it is an object of the present invention to provide a fastening system including a novel two-piece swage type fastener having a collar of a preselected wall thickness and volume and minimal clearance relative to the crests of the lock grooves of the pin resulting in a reduced magnitude of installation and/or swage load required to be applied to install the fastener.

It is another object of the present invention to provide the collar with a selected volume relative to the volume of the elongated roots of the lock grooves whereby the swaged collar material does not completely fill the lock groove roots which are generally shallow.

It is an object of the present invention to provide a novel two-piece swage type fastener in which the pin has a severable pintail and with the fastener being installed at a reduced tensile load whereby the pintail can be of reduced size.

It is another object of the present invention to provide a fastening system including a unique two-piece swage type fastener in which the pin has a threaded pull portion which is not severable and with the fastener being installed at a reduced tensile load whereby the number of engaged threads necessary for the swage load to install the fastener can be reduced and whereby the loads on the threads of the pull grooves and of the mating nut member or mating threaded spindle on the installation tool are reduced.

It is another object of the present invention to provide a fastening system including a unique swage type fastener including a pin and collar and an installation tool having a swage cavity with a preselected contour relative to the collar whereby the relative axial loads required for swaging of the collar are reduced permitting the use of a relatively small, lightweight tool while providing an installed fastener of comparable strength relative to conventional swage type fasteners of the same Grade.

It is another object of the present invention to provide a novel two-piece swage type fastener capable of being installed at substantially reduced relative axial loads and in which the pin has lock grooves of a generally helical contour.

It is another object of the present invention to provide a fastening system including a novel two-piece swage type fastener capable of being installed at substantially reduced relative axial loads and in which the pin has pull grooves of a generally helical contour and of a unique configuration to withstand the necessary installation loads.

It is another object of the present invention to provide a fastening system including a unique two piece swage type fastener capable of being installed at substantially reduced relative axial forces utilizing an internal drive.

It is still another object of the present invention to provide a fastening system including a swage anvil having a unique swage cavity.

It is another, general object of the present invention to provide a unique fastening system including a novel two-piece swage type fastener.

Other objects, features and advantages of the present invention will become apparent from the subsequent description and the appended claims, taken in conjunction with the accompanying drawings, in which:

DESCRIPTION OF THE DRAWINGS

FIG. 1 is a longitudinal, elevational view with some portions shown in section and others shown broken away of a fastener of the present invention in assembly relationship with workpieces of a generally nominal total thickness and with a portion of an installation tool shown as applied to the fastener in preparation for installation;

FIG. 2 is a view similar to that of FIG. 1 showing the fastener and the portion of the installation tool after the collar has been swaged into the lock grooves of the pin;

FIG. 5 is a longitudinal side elevational view to enlarged scale of the collar of the fastener of FIGS. 1–4;

FIG. 6 is an end view of the collar of FIG. 5 taken generally in the direction of the Arrows 6—6 in FIG. 5;

FIG. 8 is longitudinal view of a pin similar to that of FIGS. 1–4 but with the lock grooves and pull grooves being helically shaped;

FIG. 9 is a fragmentary elevational view of a portion of the shank of a pin with some portion broken away and with a modified form of helical lock groove and with an open bore at the end having threaded pull grooves for internal drive;

FIG. 9B is an enlarged fragmentary sectional view of the pin of FIG. 9 taken generally in the Circle 9B in FIG. 9 and illustrating the internal, helically shaped pull grooves;

FIG. 10 is an enlarged pictorial view of a portion of a modified form of collar shown partially broken away and including a flexible, pre-assembly tab;

FIG. 11 is an enlarged elevational, sectional view of a portion of the collar of FIG. 5 taken generally in the Circle 11 of FIG. 5 and depicting a modified form of collar including a pre-assembly limited collar thread;

FIG. 11A is a sectional view of a portion of the collar of FIG. 5 depicting another modified form of collar including a metal pre-assembly tab for use with helical lock grooves;

FIG. 11B is a sectional view of a portion of the collar of FIG. 5 taken generally in the Circle 11B and depicting an additional modified form of collar including a metal pre-assembly tab for use with helical lock grooves and at a different location in the collar;

Figure 3:
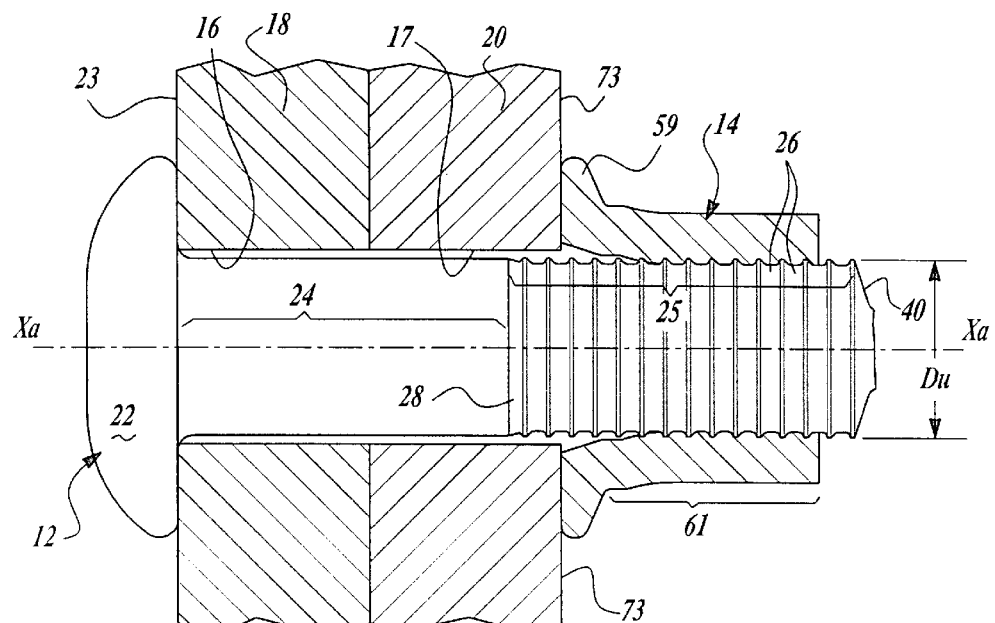
FIG. 3 is a view similar to that of FIG. 2 showing the fully installed fastener with the installation tool removed.

The grooves shown in FIGS. 4A, 7A, 8A and 9A are to the same scale for a same sized fastener and are shown vertically spaced and in horizontal alignment illustrating the relationship of the crests and grooves relative to pitch lines shown vertically in phantom. The drawings of the grooves as shown in FIGS. 4A, 7A, 8A and 9A are substantially representative of the features and details of the configuration of these grooves while the grooves in the other drawings are shown in a more general form.

DESCRIPTION OF EMBODIMENTS OF THE INVENTION

In the discussion which follows references are made to various components and a list of typical, average values for such components over a range of different sized fasteners of one form of the present invention and conventional fasteners of the same grade is provided in a CHART OF TYPICAL VALUES.

Looking now to FIGS. 1–4, a fastener 10 is shown and includes a pin member 12 and tubular collar 14. Pin member 12 has an elongated shank 15 which extends through aligned openings or bores 16 and 17 in a pair of workpieces 18 and 20, respectively, to be secured together. An enlarged protruding head 22 at one end of shank 15 engages the back side surface 23 of workpiece 18. The shank 15 has a straight, smooth cylindrical shank portion 24 adjacent the head 22 which is adapted to be received within the aligned bores 16 and 17 with a clearance fit. It should be understood, however, that in some installations the straight shank portion 24 can be sized to provide a close tolerance or desired interference fit with bores 16 and 17. Following the straight shank portion 24 is a locking shank portion 25 having a plurality of circumferentially extending, annular lock grooves 26. The locking portion 25 includes an annular transition portion 28 which smoothly connects the locking shank portion 25 with the straight shank portion 24.

A pull shank portion 41 includes a straight annular land 42 followed by a plurality of annular pull grooves 44. A breakneck groove 40 having a reduced root diameter Db is located between the locking portion 25 and the annular land 42 of the pull portion 41 and defines the weakest section on the pin shank 15. (See FIG. 4). The annular land 42 is formed as a result of metal displaced in rolling the breakneck groove 40. The pull portion 41, including the land 42 and pull grooves 44, is of a reduced crest diameter Dp, relative to the diameter Du of the crests 71 of the locking grooves 26 of the locking portion 25 which diameter Du is also the same as that of the straight shank portion 24. See FIGS. 4 and 4A. It should be understood, however, that in applications involving a close tolerance or slight interference fit with the bores 16 and 17 the crests 71 of the locking grooves 26 will be of a diameter Du smaller than that of the straight shank portion 24. The pull grooves 44 are adapted to be gripped by an installation tool 48 which is actuable to set the fastener 10. The tool 48 can be generally constructed in a manner known to those skilled in the art and hence is only partially shown for purposes of simplicity. Briefly, the tool 48 has a nose assembly 45 with a plurality of circumferentially spaced jaws 50 adapted to grip the pull grooves 44 of the pull shank portion 41. Jaws 50 are located in a tubular collet assembly 52 which is slidably supported in an anvil housing 54 which terminates at one end in a swage anvil section 56 having a swage cavity 57. The jaws 50 are normally resiliently urged axially forwardly in conical tracks 53 to a radially closed position by a jaw follower assembly 46, partially shown. As will be seen, the swage cavity 57 as configured, in combination with the collar 14, will enhance the swaging action at a reduced load.

Figure 4:
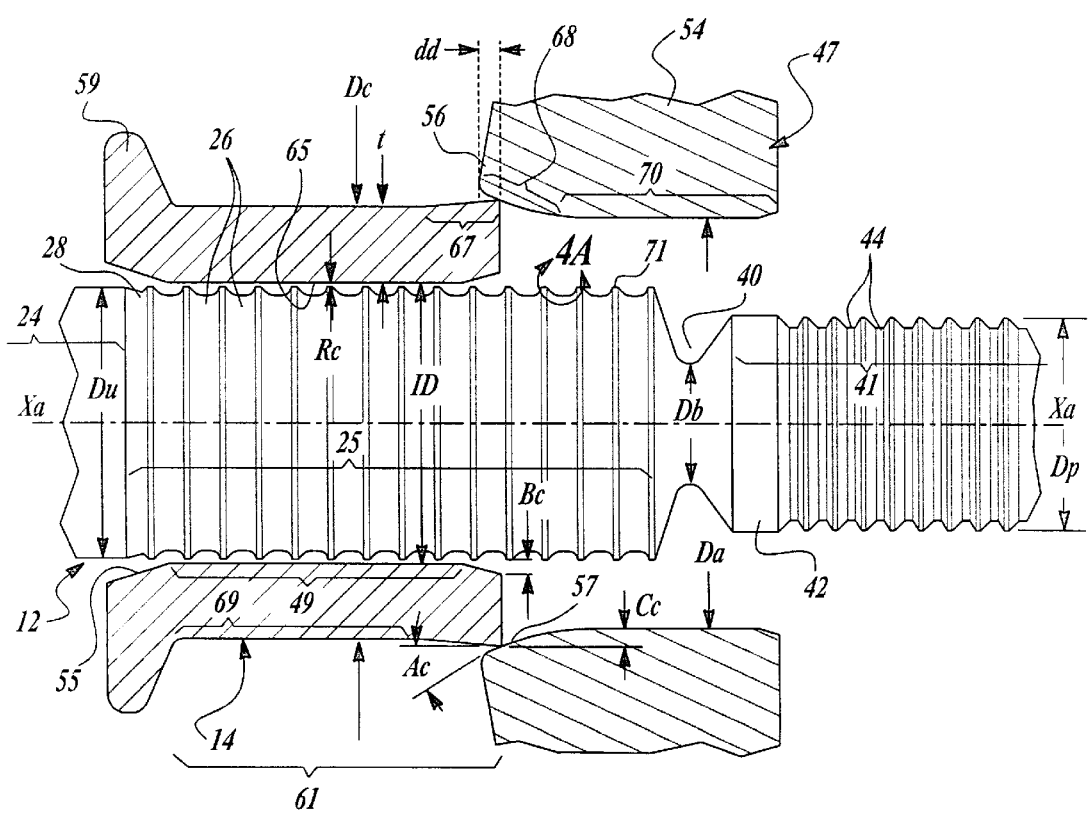
FIG. 4 is an enlarged fragmentary view to enlarged scale of the pin and collar and swage anvil of FIG. 1, with some parts omitted and illustrating the relationship between and configuration of the swage cavity of the installation tool, the collar to be swaged and the pin.

Looking now to FIGS. 4–6, the collar 14 is a flanged type and includes an enlarged diameter flange 59 with a cylindrical shank 61 and a through bore 65. The collar shank 61 is of a generally uniform cylindrical configuration with a generally uniform wall thickness t and has a straight shank portion 69 which terminates at its outer end in a radially outwardly flared shank portion 67, also generally of thickness t, which provides a hold-off function to be described. In one form of the invention the flared shank portion 67 was flared at an angle Ad at the inside diameter and a smaller angle Ad' at the outside diameter relative to the axis Xa. In addition the through bore 65 in the area of the straight shank portion 69 has a straight bore portion 49 of generally uniform diameter ID which terminates in an enlarged countersunk bore portion 55 extending through the flange 59. The magnitude of the angles Ad and Ad' are selected to provide a desired gap or space of the outer end of the flared shank portion 67 from the confronting ones of crests 71 of the lock grooves 26 and a desired point of contact with the outer lead-in end of the arcuate end 68 of the swage cavity 57 to provide the desired compressive strength of the flared shank portion 67 and to thereby provide the desired magnitude of hold-off from snubbing or initial swage into the lock grooves 26. See the CHART OF TYPICAL VALUES.

The flanged collar 14 is adapted to be located over the pin shank 15 and, with the workpieces 18, 20 pulled together, will have the collar shank 61 in radial alignment with confronting ones of the locking grooves 26. See FIGS. 1 and 2. At the same time, the flange 59 will be in engagement with the outer surface 73 of workpiece 20. The countersunk bore portion 55 assists in assembling the collar 14 onto the pin shank 15. This is especially helpful in view of the close clearance provided between the collar straight bore portion 49 and lock groove crests 71 in a manner and for a purpose to be discussed.

Note that workpieces 18 and 20 have a combined thickness tl defining a nominal grip of the fastener 10. The fastener 10, however can be employed over a predetermined grip range which varies from workpieces having a minimum total thickness less than t1 to a maximum total thickness greater than t1.

Figure 7:
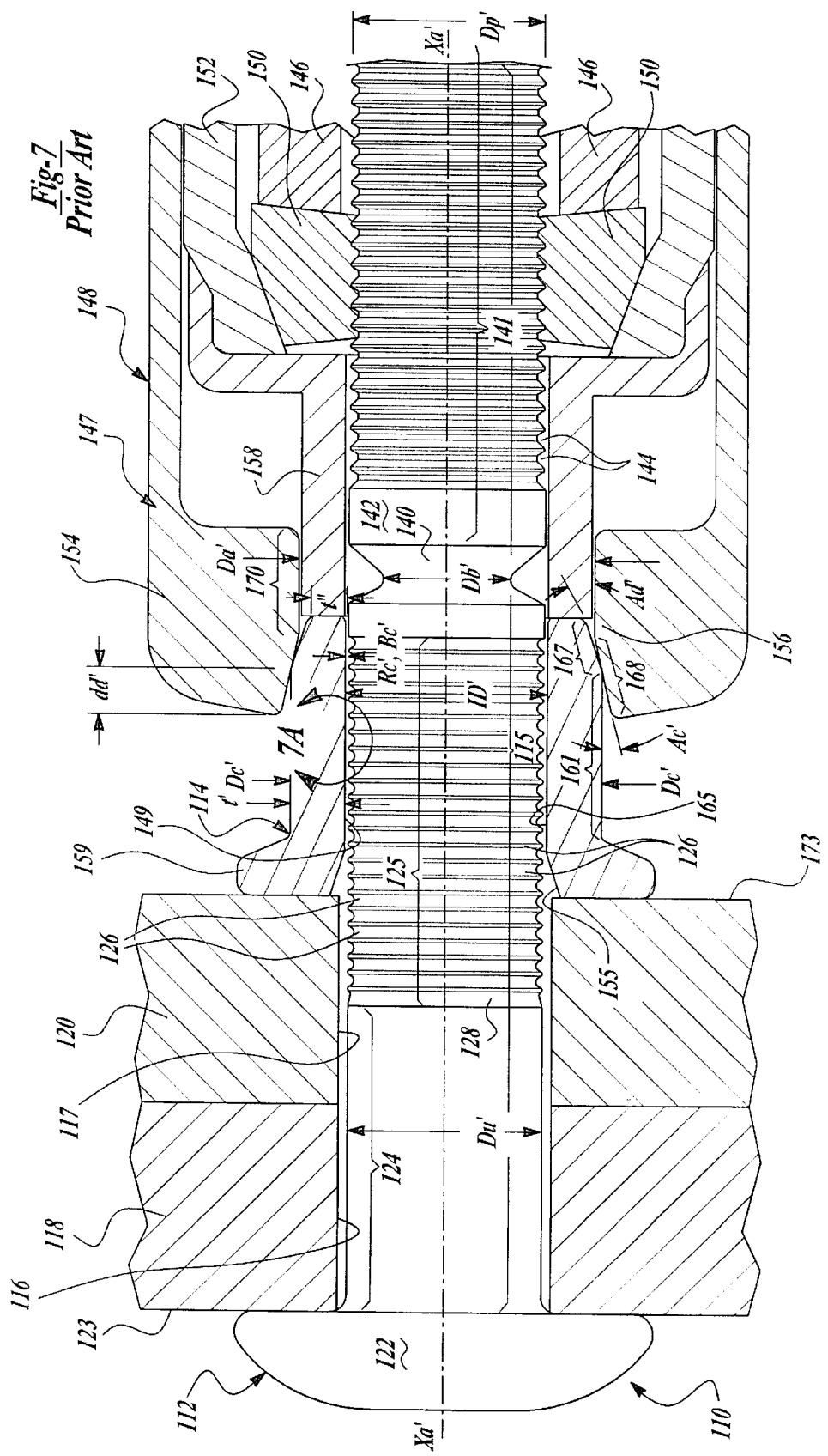
FIG. 7 is a longitudinal, elevational view, similar to FIG. 1, of a conventional, prior art swage type fastener generally of the same Grade and for similar applications as the fastener of the present invention along with the conventional installation tool.

Upon actuation of the tool 48, a relative axial force is applied between the pin 12 and collar 14 by the gripping, tensile engagement of the jaws 50 with the pull grooves 44 and the compressive engagement of the swage anvil section 56 with the flared shank portion 67 at the outer end of the collar shank 61. The flared collar shank portion 67 along with the arcuate end 68 of the swage cavity 57 provides a predetermined magnitude of resistance or hold-off from the start of swaging or snubbing into the lock grooves 26 whereby the workpieces 18 and 20 will be initially pulled together under a preselected clamp load. The magnitude of hold-off is essentially the same as with conventional swage type fasteners, such as shown in FIG. 7, whereby the initial hold-off load for closing the gap between workpieces will generally be the same. As the relative axial force is increased the swage cavity 57 including the arcuate end 68 is moved axially to radially compress the flared shank portion 67 and then to radially overengage the shank 61 of collar 14 whereby the collar shank 61 is swaged radially inwardly into the locking grooves 26 of pin 12. Upon completion of the swaging and the application of increased relative axial force or tensile load, the pin shank 15 will be severed at the breakneck groove 40, as shown in FIG. 2. Subsequently, upon further actuation of the tool 48, a collar ejector member 58 will be urged axially forwardly to engage the outer end of the collar shank 61 of the swaged collar 14 and eject it from the swage cavity 57 of the swage anvil section 56 thus completing the installation with the pull portion 41 removed. See FIG. 3.

The configuration of the swage cavity 57 assists in providing the desired hold-off while promoting the uniform radially inward flow of the material of the collar shank 61 during swage. Thus the swage cavity 57 has an axially straight swage bore portion 70 of a substantially uniform diameter which terminates at an arcuate outer lead-in end 68 which curves radially outwardly to initially provide an essentially circumferential line contact with the radially outer end surface of the flared collar shank portion 67. See FIG. 4. The flared shank portion 67 extends radially outwardly to engage the curvature of the arcuate end 68 to assist in providing a minimal lead-in distance dd and at the same time to promote a desired magnitude of hold-off. In one form of the invention the line of contact of the flared shank portion 67 was at a point on the arcuate end 68 which defined a relatively shallow angle Ac. See FIG. 4. The contact angle Ac is defined by the angle between a line tangent to the cavity arc of end 68 at its point of contact and a line parallel to the straight shank portion 69 of the collar shank 61 and to the axially straight swage bore portion 70. Thus this line is also parallel to the central axis Xa of the fastener 10. The contact Angle Ac and collar flare angles Ad and Ad', as previously noted, are selected to assist in providing the desired hold-off. At the same time the radial distance Cc from the contact point to the surface of the straight bore portion 70 where full swage occurs was selected to provide the desired sufficiently high hold-off to inhibit premature snubbing of the flared shank portion 67 by initial swage into the lock grooves 26. The desired hold-off results in the workpieces 18, 20 being pulled together to remove any gap therebetween and to clamp them together at a desired magnitude prior to initiation of swage. In this regard the radial distance Bc from the outer end of the inner surface of the flared collar portion 67 to the crest 71 of the lock grooves 26 was selected to promote hold-off while permitting initial swage or snubbing at the desired relative axial load. See CHART OF TYPICAL VALUES. At the same time, however, full swage will then occur at a relatively low axial load.

In this regard the flare angle Ad of the flared collar shank portion 67 is somewhat greater than that on conventional flared collar shank portions. This is to provide sufficient radial clearance distance Bc and compressive strength to provide the desired hold-off from initial swage or snubbing in consideration of the minimal clearance Rc between the collar bore 65 and pin crests 71 and the minimal collar wall thickness t. This is in substantial contrast with the fastener of the '852 patent in which the collar has a clearance greater than Rc and a substantially greater wall thickness and does not have a flared collar shank portion. At the same time the angle Ad' at the radially outer surface of the flared shank portion 67 is selected to provide the desired point of contact with the arcuate end 68 to assist in providing the desired magnitude of hold-off.

The anvil cavity 57 is provided with the straight swage bore portion 70 of substantially uniform minimum swage diameter Da. In the present invention, the straight bore portion 70 of the swage cavity 57 is of a sufficient axial length to overengage the collar shank 61 over a significant portion of the swaged length of the collar shank 61. In this way spring back of the radially inwardly swaged portion of the collar shank 61 behind the swage cavity 57 is minimized. At the same time the forward axial extrusion of the collar material during swage is facilitated to attain the final clamp load which is increased by such extrusion. The nose assembly 45 and overall configuration of the swage cavity 57 can be essentially the same as that which has been previously used to install fasteners of the type shown in the '852 patent, supra.

As noted the relative axial load required to swage the collar shank 61 is minimized by reducing the clearance Rc between the straight collar bore portion 49 of uniform diameter and the crests 71 of the lock grooves 26.

In the present invention this radial clearance Rc is significantly reduced radially to around one half of that of the conventional lockbolt of the type shown in FIG. 7. In this regard the hold-off provided by the flared collar portion 67 in combination with the arcuate end 68 is of even greater significance in view of the minimized clearance Rc between the straight collar bore portion 49 and lock groove crests 71 and the minimized wall thickness t of the straight collar shank portion 69. However, because of the close radial clearance provided by the minimized inside diameter ID, the outside diameter Dc can be reduced for the thickness t necessary to provide the desired volume. See FIG. 5. Thus the inside diameter ID and outer diameter Dc are selected to provide the desired wall thickness t of collar shank 61 resulting in the necessary volume of collar material for swage and the desired amount of lock groove fill, to be discussed, while providing the desired reduction in swage load. See CHART OF TYPICAL VALUES.

Figure 4A:
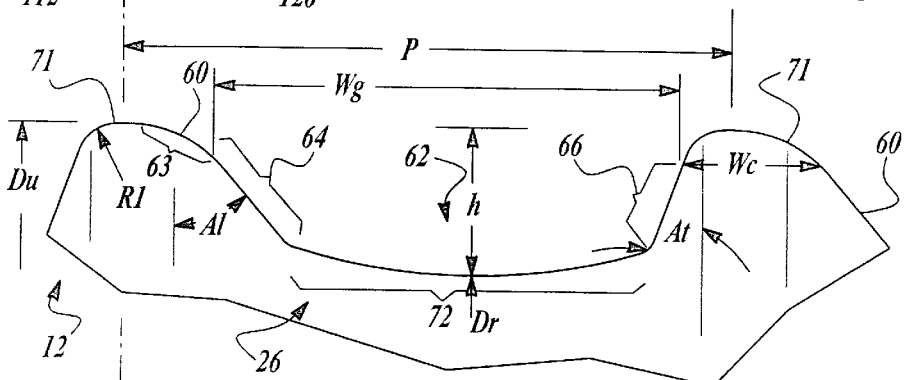
FIG. 4A is an enlarged fragmentary view of the lock groove portion of the pin of the fastener of FIG. 4 taken generally in the Circle 4A in FIG. 4.

As best can be seen in FIG. 4A, the roots 62 of lock grooves 26 are of a wide construction and have a closely approximated streamlined root configuration. In one form of the present invention this configuration is of a type generally as described in the '852 patent, supra and also of a type essentially as used in a commercial form of that fastener. However, as will be seen, in other forms of the present invention the roots and shoulders of the lock grooves are somewhat modified for purposes to be described. The roots 62, which are separated by annular shoulders 60, can be considered to be defined by a root portion 72 at the base of the root 62, which is connected at one end to a leading transition or flank portion 64 and at the opposite end to a trailing transition or flank portion 66. The transition portions 64 and 66 intercept the root portion 72 with radiused connections. In order to approximate a streamlined shape, the root 72 is generally elliptically shaped. However, as will be seen, since the material of the collar 14 is not swaged fully into compressive engagement with the root portion 72 contours other than elliptical could be used. However the streamlined portions at the areas of engagement by the swaged collar material are important to facilitate flow of the swaged material at reduced swage loads.

In addition to the above, the lock grooves 26 are further defined by the following:

1. P is the pitch between successive lock grooves 26;
2. h is the depth of roots 62 (or thread depth for a threaded pin);
3. Dr is the effective root diameter of roots 62 (or of the thread for a threaded pin) across which the tensile load is applied;
4. Du is the crest diameter of the crests 71 of pin shoulders 60 (or the diameter defined by the crests of a threaded pin).

In one form of the invention, the trailing transition or flank portion 66 was provided to be at a steep angle At with a plane transverse to the axis Xa of pin 12 while the leading transition or flank portion 64 was provided to be at a larger angle A1. The angle A1 of the leading transition portion 64 facilitates flow of the material of collar 14 in swage while the steeper angle At of trailing portion 66 provides a buttressing effect to contain the swaged collar material. The buttressing effect assists in converting collar extrusion or elongation during swage into clamp load on workpieces 18 and 20 and also assists in resisting tensile loads on the installed fastener 10. See CHART OF TYPICAL VALUES.

In order to facilitate the flow of the material of collar 14 during swage an arcuate transition portion 63 is provided between the crests 71 of shoulders 60 and the leading transition portion 64. In addition a radius R1 is provided between the crests 71 of shoulders 60 and the trailing transition portion 66. The arcuate portion 63 and radius R1 assist in reducing the radially compressive force required to be applied to the collar 14 by the swage cavity 57 for swage and accordingly facilitates in the reduction of the relative axial force required to axially move the swage cavity 57 to radially overengage the collar 14 during swage. This is generally the same contour as utilized with fasteners made in accordance with the '852 patent, supra.

With the fastener construction of the present invention, the depth h of each of the roots 62 can be selected to provide a desired minimum ratio of depth h to the crest or major diameter Du of the crests 71 of lock grooves 26 of pin 12. In this regard, one of the major criteria of groove depth h is that it be sufficiently deep as a practical matter to receive and retain the material of the collar 14 after swage while the root portion 72 is still in a partial clearance relationship with the swaged collar material. In one form of the invention a groove depth h of between around 0.03×Du to around 0.033×Du was suitable. With such a groove, the root or minor diameter Dr will be maximized for a pin with a given crest diameter Du. See CHART OF TYPICAL VALUES. This will provide that a pin 12 of a given material will have nearly the maximum tensile strength available since tensile failure of pin 12 would occur across the root diameter Dr which, when maximized, is only slightly less than the crest diameter Du. The maximized root diameter Dr of extended width will also provide desired fatigue life. At the same time, the root 62 being wide and of the simulated streamlined or elliptical shape at root portion 72 will result in a low stress concentration factor which further assists in fatigue life.

The collar 14 is provided with a volume less than that required to fill the roots 62 when swaged into the locking grooves 26. Thus this construction is also substantially different from the fastener of the '852 patent, supra. Here the swaged collar 14 does not overpack or completely fill the roots 62 and in one embodiment the percentage of fill of roots 62 was no greater than around 95% of the depth h and preferably in a range of around 70% to 90% filled. In this regard a percentage of fill significantly under 70% may not provide the desired high preloads while a percentage of fill significantly over 90% could result in excessively high installation loads which could require a larger, stronger breakneck groove 40 to prevent premature failure and/or require a larger, heavier installation tool. With the wide groove structure it is believed that a fill of at least up to the pitch diameter is desirable. The pitch diameter can be defined as the diameter of a rolling pin blank before rolling the lock grooves 26.

In one embodiment, the portion of the collar shank 61 to be swaged was selected to have a preswaged volume greater than that needed to partially fill grooves 26 within the swage envelope. The swage envelope can be defined by the minimum diameter Da of straight portion 70 of the swage cavity 57 of anvil section 56 and the cylindrical area defined by the confronting portion of the lock grooves 26 of pin 12 (see FIGS. 1–4). In this regard the volume of the swage envelope can be considered to be the volume between the pitch diameter or diameter of the pin blank before rolling the lock grooves 26 and the straight portion 70 of the swage cavity 57. During swaging, however, a portion of the material of the collar shank 61 is displaced in axial extrusion and elongation which enhances the magnitude of final clamp load on the workpieces 18, 20 and which, at the same time, results in the lock grooves 26 not being fully filled. As a result, the material of the collar shank 61 is not fully engaged with and compressed against the root portions 72 of the lock groove roots 62 during swage whereby the collar shank 61 can be swaged at a substantially reduced relative axial load. This is in contrast to the fasteners of the '852 and '096 patents where the percentage excess volume is substantially greater, and in which the collar material is fully engaged with and compressed against the roots of the lock grooves. On the other hand, with the conventional fastener of FIGS. 7 and 7A while the preswage volume of the collar 114 is greater than the volume in the swage envelope the collar material is not compressed against the roots.

It is desirable that the pin 12 be hard enough relative to the hardness of the collar 14 to resist crushing or excessive yielding in tension or necking down from the compressive swage loads. Thus, in one form of the invention, for the Grade 5 type fastener, for example the pin 12 could be made of AISI 1038 steel or AISI 1541 steel or other comparable materials for the same Grade having a hardness of around Rc24 to around Rc35 and an ultimate tensile strength of at least around 120 KSI. The collar 14 could be made of AISI 1010 carbon steel being thermally processed to between around Rb65 to around Rb85 and an ultimate tensile strength of at least around 60 KSI. Thus the pin 12 has a sufficient hardness to accept both the high tensile preloads desired and the swage loads on the collar 14 without substantially yielding. In addition the collar 14 can be coated with a conventional lubricant such as a water soluble polyethelene wax or cetyl alcohol. The collar 14 could also be zinc plated. This assists in maintaining swage loads at the desired low level and also minimizes wear of the swage cavity 57.

Thus the shank 61 of collar 14 is provided with a sufficient wall thickness t and, hence, volume to insure that enough collar material will move axially in elongation. At the same time it is desirable that the swaged collar will have sufficient wall thickness and, hence sufficient strength, such that the pin shoulders 60 and collar shoulders formed during swage remain in substantially full engagement as the design tensile load on the joint is reached. In this regard, the required wall thickness t of the collar shank 61 will increase for larger diameter fasteners and decrease for smaller diameter fasteners. See CHART OF TYPICAL VALUES.

As noted the swage type fastener of the present invention is primarily designed for use in applications such as those of the conventional swage type fastener shown in FIG. 7. In the discussion of FIG. 7 components similar in whole or in part to those of the embodiment of FIGS. 1–4 have been given the same numeral designation with the addition of 100 and unless described otherwise are generally of the same construction.

Looking now to FIG. 7, the fastener 110 includes a pin member 112 and a tubular collar 114 and has a central axis Xa'. Pin member 112 has an elongated shank 115 extending through openings 116 and 117 in workpieces 118 and 120, respectively, to be secured together. A protruding head 122 at one end of shank 115 engages the back side surface 123 of workpiece 118. The shank 115 has a smooth cylindrical shank portion 124 which is located within the aligned bores 116 and 117. Adjacent the straight shank portion 124 is a locking shank portion 125 with a plurality of annular lock grooves 126. An annular transition portion 128 connects the locking shank portion 125 with the straight shank portion 124.

A pull shank portion 141 includes a straight annular land 142 followed by a plurality of annular pull grooves 144. A breakneck groove 140 having a diameter Db' is located between the annular land 142 of the locking portion 125 and the pull portion 141. The pull portion 141, including the land 142 and pull grooves 144, is of a slightly reduced crest diameter Dp', relative to the diameter Du' of the crests 171 of the locking grooves 126 which is approximately the same as the diameter of the straight shank portion 124. The pull grooves 144 are adapted to be gripped by a tool 148 which can be of a general construction similar to that of tool 48 previously described. However, because of the higher swage loads required to install the fastener 110, the tool 148 will be larger and heavier than tool 48. In this regard, the diameter Da' of straight cavity portion 170 of swage anvil section 156 is smaller than diameter Da of swage bore portion 70.

The collar 114 has a through bore 165 and includes a cylindrical shank 161 terminating at one end in an enlarged bearing flange 159. The collar shank 161 has a straight shank portion 169 of a generally uniform cylindrical configuration with a generally uniform wall thickness t'. The shank portion 169 terminates at its outer end in an outer shank portion 167 having an outer surface extending arcuately, radially inwardly and tapering to a reduced wall thickness t". Thus the angle of taper of arcuate shank portion 167 at its outer surface would be at an angle Ad' which would be negative compared to angle Ad of shank portion 67. Also since the radially inner surface of bore portion 149 is not tapered there the angle AD' would be zero and hence is not shown on the drawings. In addition the through bore 165 has a straight bore portion 149 of generally uniform diameter ID' extending through the straight shank portion 169 and the outer, arcuate shank portion 167. The straight bore portion 149 terminates at its inner end in an enlarged countersunk bore portion 155 at the flange 159.

Here the relative axial force for installation is applied between the pin 112 and collar 114 by the engagement of the jaws 150 with the pull grooves 144 and the engagement of the substantially straight, tapered outer lead-in end 168 of the swage cavity 157 with the arcuate, radially inwardly extending surface of outer shank portion 167 of the collar shank 161. The radially outer arcuate surface of collar shank portion 167 along with the tapered end 168 of the swage cavity 157 results in an extended lead-in distance dd' in contrast to the minimized lead-in distance dd of the flared shank portion 67 of the fastener 10. Here, however, the predetermined magnitude of resistance or hold-off from the start of swaging or snubbing into the lock grooves 126 is affected by the greater clearance distance Rc' and a larger inside diameter ID' with the outside diameter Dc' being substantially the same as outside diameter Dc of collar shank portion 69. The magnitude of hold-off, however, is essentially the same as that of the fastener 10 which has a lesser clearance distance Rc and a smaller inside diameter ID. The wall thickness t' of the collar shank 161, however, is less than the wall thickness t of the collar shank 61. See CHART OF TYPICAL VALUES.

Thus, as noted, the relative axial load required to swage the collar shank 161 is substantially greater due, in part, to the larger inside diameter ID' and greater clearance Rc' between the straight bore portion 149 of uniform diameter and the crests 171 of the lock grooves 126. Thus in a typical, conventional ⅝ inch lockbolt of the type of fastener 110 shown in FIG. 7 the radial clearance Rc' between the straight bore portion 149 of collar bore 165 and lock groove crests 171, at each side is radially around 0.021 inches or diametrically around 0.042 inches overall. In the fastener 10 of the present invention the radial clearance Rc is significantly reduced radially to around 0.011 inches or diametrically to 0.022 inches overall. In view of the larger clearance Rc', and inside diameter ID' and the thickness t', although less than t, required to provide the necessary volume of collar material for the desired swage and lock groove fill, the relative axial force required for swage of collar shank 161 is substantially greater than that of collar shank 61. In addition the diameter Da' of the anvil throat of the swage cavity 157 is less than the diameter Da of swage cavity 57 in order to swage the thinner walled collar shank 161 to provide adequate fill of the lock grooves 126. This necessitates a significantly high magnitude of relative axial force or swage load to properly swage the collar shank 161. In addition, the configuration of the lock grooves 126, the width of the roots 162 and the number of crests 171 to be engaged in swage are also factors resulting in higher swage loads. See CHART OF TYPICAL VALUES.

Figure 7A:
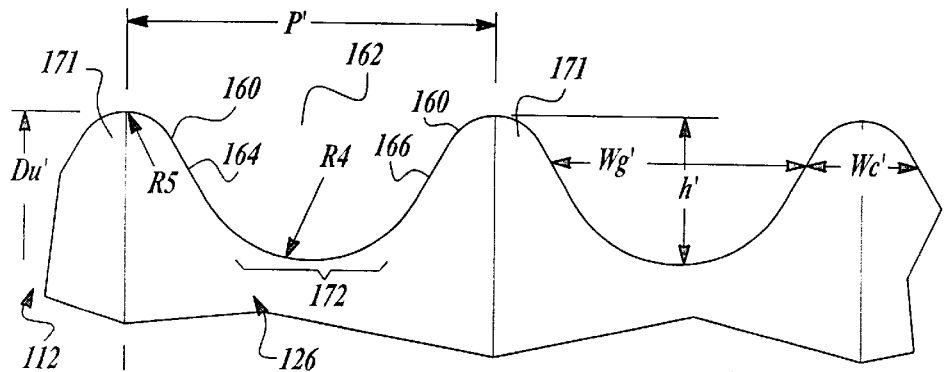
FIG. 7A is an enlarged fragmentary view of the lock groove portion of the pin of the fastener of FIG. 7 taken generally in the Circle 7A.

As best can be seen in FIG. 7A, the lock grooves 126 are of a generally modified sine wave contour. Here the roots 162, which are separated by annular shoulders 160, can be considered to be defined by an arcuate root portion 172 of generally uniform radius R4 at the base of the root 162, which is connected to a leading transition portion 164 and to a trailing transition portion 166 which are generally straight. The root radius R4 is larger than the radius R5 of crests 171. However, the width of the shoulders 160 is generally the same as the width of the roots 162 along the pitch diameter and the pitch P' is substantially less than the pitch P for the pin 12 of fastener 10. In addition the radius R4 at the root portion 172 is substantially less than that for root portion 72 of fastener 10 with the root portion 72 being substantially wider then the root portions 172. This means that for a given length of collar shank 61, 161 the collar shank 61 will engage substantially fewer crests 71 and less crest area than the crests 171 and resultant crest area engaged by collar shank 161 in swage. At the same time it is believed that the larger width of the root portions 72 facilitates the material of the collar shank 61 to be more readily displaced and flow in forward and rearward extrusion to assist in attaining the desired magnitude of clamp load. This will further reduce the magnitude of swage load required for the fastener 10 in comparison to the fastener 110.

Typically the ratio of groove depth h' to crest diameter Du' of h'/Du'×$10^2$ of around 3.6% has been used. Also the lock grooves 126 are not completely filled and are typically filled to between around 40% and 60% of the groove depth h'. This is in contrast to the pin 12 with lock grooves 26 having a ratio of h/Du×102 of around 3.2% and in which the lock grooves 26 are filled to between around 70% and 90% of the groove depth. It will be seen, however, that other forms of wide lock grooves of different depths and contours can be used with different percentages of fill.

The result then is a reduction in swage load of around 25% to around 40% for the fastener 10 in comparison to the fastener 110 for the same Grade or strength. In this regard, then, final clamp load on workpieces 18, 20 attained by fastener 10 is around 160% of the swage load while that for fastener 110 is around 130% of the swage load. This then permits the diameter Db of the breakneck groove 40 of pin 12 to be reduced to around 80% of the diameter Db' of pin 112. This also facilitates an overall reduction in the diameter DP and size of the pull portion 41 to 80% relative to the diameter DP' and size of pull portion 141. This will result in a substantial reduction in the final installation load required for fracture of the breakneck groove 40 relative to that for breakneck groove 140. This will also result in a reduction in weight of the pull portion 41 of pin 12 of around 40% compared to the weight of the pull portion 141 of pin 112 with a related cost savings in material.

As a result the size of the installation tool 48 can be reduced resulting in a corresponding reduction in weight of around 40% compared to the weight of tool 148.

The pin 112 is also constructed to be hard enough relative to the hardness of the collar 114 to resist crushing or excessive yielding in tension or necking down from the compressive swage loads. Thus, in one form of the conventional fastener 110, for the Grade 5 type fastener, for example the pin 112 could be made of AISI 1038 steel or AISI 1541 steel or other comparable materials for the same Grade having a hardness of around Rc24 to Rc35 and an ultimate tensile strength of at least around 120 KSI. The collar 114 could be made of AISI 1010 steel being thermally processed to between around Rb60 to around Rb75, a lower hardness range than for collar 14. In addition the collar 114 can be coated with a conventional lubricant such as a water soluble polyethelene wax or cetyl alcohol. The collar 114 could also be zinc plated.

Thus the fasteners of the present invention are in complete contrast to the conventional swage type fasteners noted above and other swage type fasteners. In this regard, with fasteners of the present invention the wall thickness t, while greater than wall thickness t', has been selected to be at a minimum while still having the necessary volume of material to provide the desired percentage of groove fill and extrusion as noted. In this regard the wall thickness t is less than that for the fastener of the '852 patent. Also the clearance Rc between the diameter ID of the collar bore 65 and the cylindrical shank 61 and the diameter Du of the crests 71 of the shoulders 60 of lock grooves 26 is minimized. By selecting the wall thickness t and minimizing the clearance Rc the outside diameter Dc and inside diameter ID of the collar 14 will also be reduced resulting in a reduced or minimized magnitude of required swage load. By thus selecting the wall thickness t to prevent overfill of the lock grooves 26, minimizing the clearance Rc, this thereby minimizes the magnitude of relative axial force required to axially move the swage anvil cavity 57 to overengage the shank 61 of collar 14 to compress it radially inwardly for swage. Another factor resulting in decreased swage loads is in utilizing wider lock grooves 26 of an increased pitch with the width of the crests 71 being substantially less than the width of the grooves whereby the amount of engagement of the collar material with the number of engaged crests 71 is substantially minimized which facilitates radially inward flow of the collar material during swage. For example in one form of the invention the number of engaged crests 71 of pin 12 for fastener 10 in comparison to the number of engaged crests 171 of pin 112 for fastener 110 for the same length of collar shank portions 61 and 161 was reduced from 12 to 7. In this regard, it is estimated that the ratio of crest width Wc to groove width Wg, measured along a line generally where the arcuate portions of the crest intersect the flanks, for the lock grooves 26 was around 26% while the ratio of crest width Wc' to groove width Wg' for lock grooves 126 was around 40%. Thus it can be seen that even if the crest widths Wc and Wc' were the same, the amount of crest engagement for a given length of swaged collar shank would be substantially less for the lock grooves 26 compared to lock grooves 126. In this regard, it is believed that a ratio of crest width to groove width less than around 30% is desirable and preferably less than 25%.

For a pin 12 and collar 14 of the ferrous materials having the relative shear strengths previously noted for a Grade 5 fastener, the dimensional relationships on the following chart were found satisfactory and are shown in comparison with the conventional Grade 5 fastener of FIG. 7 for a pin 112 and collar 114 followed by comparative performance values; linear dimensions are given in inches while angular dimensions are in degrees and force values such as load, tensile, etc. are in pounds.

| | CHART OF TYPICAL VALUES | | | | | |
|---|---|---|---|---|---|---|
| | FASTENER 10 PRESENT INVENTION Grade 5-Pin 12, Collar 14 | | | FASTENER 110 CONVENTIONAL Grade 5-Pin 112, Collar 114 | | |
| Nom. Dia. | ½ inch | ⅝ inch | ¾ inch | ½ inch | ⅝ inch | ¾ inch |
| | PIN 12 | | | PIN 112 | | |
| Pin Crest Dia. $D_u$, $D_u'$ | .497 | .622 | .747 | .490 | .613 | .738 |
| Root Depth - h, h' | .016 | .0205 | .024 | .018 | .022 | .026 |
| Breakneck Dia. $D_b$, $D_b'$ | .268 | .304 | .329 | .294 | .393 | .428 |
| Pull Groove Crest Dia. - $D_p$, $D_p'$ | .409 | .473 | .590 | .473 | .590 | .711 |
| Pitch P, P' | .076 | .091 | .097 | .048 | .055 | .062 |
| $\dfrac{W_c (W_c')}{W_g (W_g')}$ | .26 | .26 | .26 | .40 | .40 | .40 |
| Angle $A_t$, $A_t'$ | 20 | 20 | 20 | 30 | 30 | 30 |
| Angle $A_l$, $A_l'$ | 40 | 40 | 40 | 30 | 30 | 30 |
| Crests per inch | 13 | 11 | 10.3 | 21 | 18.2 | 16 |
| Root Dia. $D_r$, $D_r'$ | .465 | .581 | .699 | .454 | .569 | .686 |
| $h/D_u (D_u') \times 10^2$ | 3.2 | 3.3 | 3.2 | 3.7 | 3.6 | 3.5 |
| | COLLAR 14 | | | COLLAR 114 | | |
| Collar Pre-Swage O.D. - $D_c$, $D_c'$ | .794 | .990 | 1.187 | .798 | .986 | 1.183 |
| Collar Pre-Swage ID, ID' | .514 | .643 | .771 | .521 | .654 | .784 |
| Collar Wall - t, t' | .140 | .174 | .208 | .139 | .166 | .200 |
| Length Shank - LS, LS' | .600 | .755 | .885 | .616 | .788 | .945 |
| Flare Angle $A_D/A_d$ ($A_D'/A_d'$) | 15°/5° | 15°/5° | 15°/5° | 0°/-21° | 0°/-15° | 0°/-15° |
| Clearance $R_c$, $R_c'$ | .009 | .011 | .012 | .016 | .021 | .023 |
| Percent Clearance | 3.6 | 3.5 | 3.2 | 6.5 | 6.9 | 6.2 |
| $\dfrac{2R_c (R_c')}{D_u (D_u')} \times 10^2$ | | | | | | |
| Percent Fill-Swaged | 90 | 90 | 90 | 60 | 60 | 60 |
| | Swage Anvil Section 56 | | | Swage Anvil Section 156 | | |
| Clearance $B_c$, $B_c'$ | .035 | .039 | .040 | .016 | .021 | .023 |
| Anvil Throat Dia.-$D_a$, $D_a'$ | .753 | .939 | 1.125 | .724 | .903 | 1.094 |
| Angle $A_c$, $A_c'$ | 21.5 | 21.4 | 22 | 14 | 14 | 14 |
| $C_c$, $C_c'$ | .035 | .043 | .049 | N/A | N/A | N/A |
| dd, dd' | .049 | .046 | .048 | .220 | .240 | .280 |
| Typical Values | Performance-Fastener 10 | | | Performance-Fastener 110 | | |
| Snub Load | 3,000 | 6,000 | 9,000 | 3,000 | 7,000 | 11,000 |
| Swage Load | 8,000 | 13,000 | 18,000 | 12,000 | 19,000 | 27,000 |
| Breakneck Load | 11,000 | 17,000 | 22,000 | 17,000 | 26,000 | 34,000 |
| Final Clamp Force | 15,000 | 23,000 | 35,000 | 15,000 | 23,000 | 35,000 |
| Final Tensile | 21,000 | 34,000 | 48,000 | 21,000 | 34,000 | 48,000 |

Thus it can be seen that, for fasteners of nominal diameter ½ inch to ¾ inch, while the ratio of pull groove crest diameter $D_p'$ to pin crest diameter $D_u'$ for pin 112 was round 96% the ratio of pull groove crest diameter $D_p$ to pin crest diameter $D_u$ for pin 12 was between around 76% to around 82%. At the same time the ratio of breakneck diameter $D_b'$ to pin crest diameter $D_u'$ was around 58% to around 64% while the ratio of breakneck diameter $D_b$ to pin crest diameter $D_a$ was around 44% to around 54%. The result is a substantially small pull portion 41 for pin 12 compared to pull portion 141 for the conventional pin 112. It is believe that groove structures could be provided having diameters $D_p$ between around 70% to around 80% of the diameter $D_u$ and diameter $D_b$ between around 40% to around 50% of the diameter $D_u$.

The preceding values are by way of example and for the fastener 10 can vary somewhat; for example the percent clearance defined by $2 R_c/D_u$ can vary from around 1.0% to around 4.0%. For the fastener 10 with pins 12 varying in nominal diameter from ½ inch to ¾ inch typical clearance ratios would be from around 2.5% to around 3.8%. Also the performance values are typical, average values and can vary as in other forms to be described. It should be understood that while the preceding chart sets forth values for fasteners varying in nominal diameter from ½ inch to ¾ inch the concepts taught herein can be extended to fasteners of nominal diameter varying at least from around ¼ inch to around 1–¼ inch.

It is of interest to note that in comparative tests of the ⅝ inch fastener 10 and 110 by fully compressing only the collars 14 and 114 in air by the respective swage anvil sections 56 and 156, the collar 14 was fully compressed at around 6,500 pounds axial load while the collar 114 was fully compressed at around 9,700 pounds. This reduction in load for compression of collar 14 versus collar 114 was about one third which is essentially the same percentage reduction of the comparative full swage loads into the lock grooves 26 and 126 of pins 12 and 112, respectively, i.e. 13,000 pounds vs. 19,000 pounds. This would indicate that the combination of elements noted including lock groove configuration, collar geometry and swage anvil design each contribute to the overall reduction in swage load of fastener 10 versus the conventional fastener 110. However, it will be seen that even further reductions in swage load are provided by the modified lock groove configuration of lock grooves 26a and 26b of FIGS. 8A and 9A.

It is believed that the substantial increase in final clamp load of the workpieces 18, 20 relative to the magnitude of relative axial load required for swage is caused by the extrusion or elongation of the collar material as it is being swaged. Thus with the fastener 10 of the present invention, a desirable high level of retained preload can be secured on the fastened joint.

In a modified form of the present invention helical lock grooves are shown and can be of the same contour as shown in the embodiment of FIGS. 1–6; thus the embodiment of FIG. 8 can employ the wide grooves 26 of FIGS. 1–6 which at the same time are helically shaped so that at the deepest points one groove will be diametrically opposite a point which is not as deep; in this way the effective diameter Dr and hence area will be somewhat greater resulting in even further improvements in tension and fatigue. At the same time the effective number of lock grooves filled will not be sensitive to the total thickness or grip of the workpieces as can be the case with annular lock grooves. In addition the embodiment of FIG. 8 is adapted to be installed as a threaded fastener as shown in the '755 patent, supra, and as such utilizes an extension of the helical lock grooves as pull grooves to be threadably engaged by a threaded thimble or nut on the pull tool.

Figure 8A:
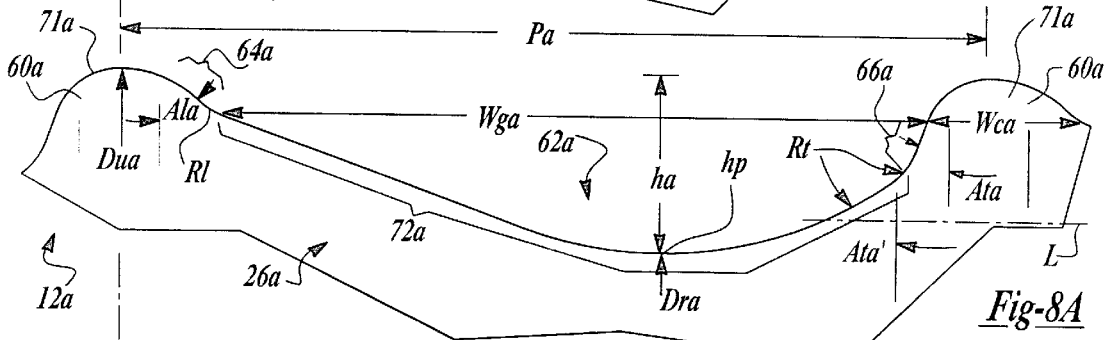
FIG. 8A is an enlarged fragmentary view of the combined lock grooves and pull grooves taken generally in the Circle 8A and depicting a modified form of groove.

The embodiment of FIG. 8, as described, is adapted to utilize a pin having a modified form of combined helical pull and lock grooves as shown in FIG. 8A. Thus in the description of the embodiment of FIGS. 8 and 8A components similar to like components in the embodiment of FIGS. 1–4A have been given the same numeral designation with the addition of the letter postscript "a" and unless described otherwise can be considered to be substantially the same.

As will be seen, the lock grooves of the embodiment of FIG. 8A have been modified to provide a further reduction in swage load and also to have a contour which facilitates gripping by the threaded thimble or nut member of the installation tool and the use of a thread form both on the lock grooves and on the thimble or nut member of a higher strength. The pin with the lock grooves of FIG. 8A is adapted to utilize the collar 14 and swage anvil section such as swage anvil section 56.

The pin 12a has lock grooves 26a which also function as pull grooves and are defined by a continuous uniform helical thread form and with no intervening breakneck groove. As best can be seen in FIG. 8A, the roots 62a of lock grooves 26a are of a wide construction and have roots with a generally smooth configuration. The roots 62a, which are separated by annular shoulders 60a, can be considered to be defined by a root portion 72a at the base of the root 62a, which is connected at one end to a leading transition portion 64a and at the opposite end to a trailing transition or flank portion 66a. In order to provide a smooth contour, the root portion 72a is generally broadly arcuately shaped. Actually, the arcuate contour includes a radiused portion closely connected to the trailing transition portion 66a at one end and the other end to the leading transition portion 64a by a gradually inclined, tangential surface. It can be seen that the leading transition portion 64a is generally arcuately contoured and extends at a relatively wide or flat angle A1a and as such can be considered to be a portion of the crest 71a.

In addition to the above, the lock grooves 26a are further defined by the following:

1. Pa is the pitch between successive lock grooves 26a;
2. ha is the thread depth of roots 62a;
3. Dra is the effective root diameter of thread roots 62a;
4. Dua is the crest diameter of the thread crests 71a of pin shoulders 60a.

In one form of the invention, the trailing transition portion 66a was provided to be at a steep angle Ata of 20° with a plane transverse to the axis of pin 12a while the leading transition portion 64a was provided to be at a substantially larger angle A1a of 70°.

Here, however, the groove 26a is considerably deeper at a point hp proximate to the trailing transition portion 66a and thus the groove depth ha is greater than the depth h of groove 26 by around 30%. At the same time, the grooves 26a are of a pitch Pa which is approximately 40% greater than pitch P of grooves 26 and 133% greater than pitch P' of grooves 126. This results in even fewer crests 71a being engaged per unit length by the collar shank, such as shank 61, in swage resulting in a decrease in swage load. In addition the point hp of maximum groove depth is located proximate the trailing transition portion 66a within around ⅓ of the pitch Pa from the crest 71a. This provides an enlarged shear plane area along an engagement line L to resist installation pull loads and also facilitates providing the thread 212 of the pull thimble or nut 202 to have a greater shear area and strength. The engagement line L is at a depth point of around 80% of depth ha which depth point is approximately equal to the depth h of grooves 26. Because of the increased pitch Pa and groove width Wga the increased depth ha can be provided while still having a generally smooth connection to the leading and trailing transition portions 64a, 66a. At the same time the adjacent section of the root 72a is connected to the trailing transition portion by a relatively wide angle Ata' which for a ⅝ inch nominal diameter fastener would be around 70°. However, it can be seen that by comparison to the similarly located portions of roots 72 and 72b of lock grooves 26 and 26b the angle Ata' is relatively steep. This provides a sufficient amount of lock groove material to resist deformation at undesirably low axial loads whereby sufficient gap is maintained at the initiation of swage to avoid engagement of the nut or pull thimble 202 by the collar shank 61a in extrusion after full swage.

It should be noted that leading transition portion 64a and trailing transition portion 66a are connected to the root portion 72a by reduced radii R1 and Rt, respectively, whereby the adjacent sections of the root portion are slightly, offset axially and radially. It is believed that this assists in reducing the swage load by providing space for the collar material as it is swaged over the crests 71a. In this regard, in one construction, the radius R1 was located from crest 71a approximately at 18% of the depth ha while the radius Rt was approximately at 47% of the depth ha. At the same time the ratio of crest width Wca to groove width Wga for lock grooves 26a was estimated to be around 20%. In this regard the crest width Wca and groove width Wga were taken at radius point R1 in view of the larger angle A1a of leading transition portion 64a. It is believed that this then represents the effective area of initial engagement for swaging. The angle A1a of the leading transition portion 64a and the offset of radius R1 facilitates flow of the material of collar 14a in swage while the steeper angle Ata of trailing portion 66a provides a buttressing effect to contain the swaged collar material to function as noted before.

Also, as previously noted with shoulders 60 of lock grooves 26, the flow of the material of the collar, such as collar 14, during swage is assisted by the arcuately shaped crests 71a and shoulders 60a.

Since, as noted, the pitch Pa of the lock grooves 26a is greater than the pitch P of lock grooves 26 a slightly longer collar shank, such as shank 24, is required to assure that a sufficient number of pin shoulders 60a are engaged to provide and hold the desired clamp and final tensile load. In applying a relative axial force to the pin 12a for installation the mating thread of the threaded nut member of the installation tool will essentially engage and apply the tensile load by engagement with the trailing transition portion 66a. As noted the construction of the groove 26a provides for a large and radially deep surface of engagement whereby at the same time, fewer threads need to be engaged for a given magnitude of axial load permitting a reduction in the length of the shank 15a of the pin 12a and the size of the associated nut or thimble member of the pull tool. This is further assisted by the fact that the final installation is essentially complete at full swage since no breakneck groove is required to be fractured. At the same time the depth of fill of roots 62a at swage is approximately 60% to 80% which is generally less than that for the roots such as roots 62, i.e. 70% to 90%. However, it should be noted that here the percent of fill is measured relative to the maximum groove depth ha which is measured at the point hp which is offset from the center of the root 72a.

The following chart lists the typical dimensions for the pin 12a, for use with a corresponding collar such as collar 14, and a swage anvil, with a swage section such as swage anvil section 56. The dimensions are provided for a Grade 5 fastener of a ⅝ inch nominal diameter with typical, average performance values.

| PIN 12a, COLLAR GRADE 5, NOMINAL DIA. ⅝ INCH | | | | | | |
|---|---|---|---|---|---|---|
| Pin Crest Dia.-Dua | Root Depth-ha | Crests per inch | $\dfrac{Wca}{Wga}$ | Pitch Pa | Angle A1a | Angle Ata |
| .622 | .027 | 8 | .204 | .130 | 70° | 20° |
| ha/Dua × $10^2$ | Root Dia. Dra | Final Clamp Force | Percent Fill-Swaged | Snub Load | Swage Load | Final Tensile |
| 4.3 | .568 | 22,000 | 60% | 6,000 | 11,500 | 29,810 |

It should be understood that while the preceding chart sets forth values for a fastener having a nominal diameter of ⅝ inch, the concepts taught herein can be extended to fasteners of nominal diameters varying from at least around ¼ inch to around 1–¼ inch.

Figure 9A:
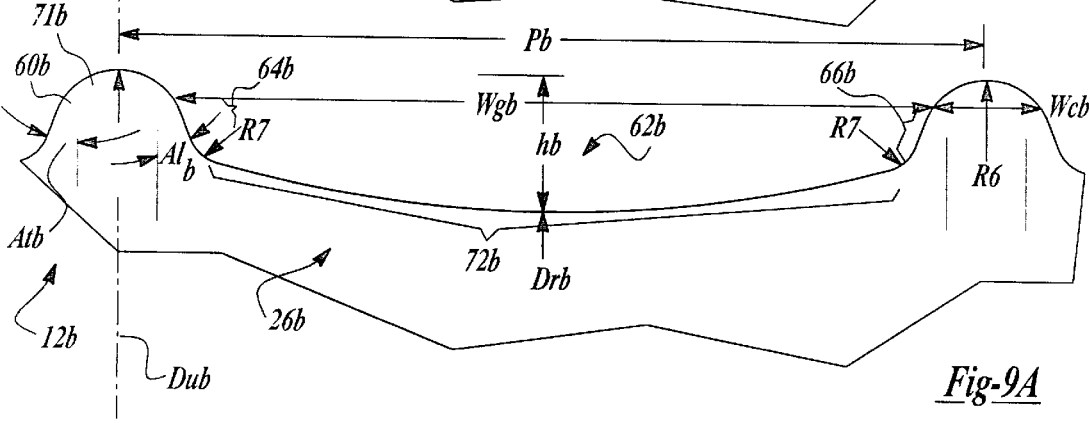
FIG. 9A is an enlarged fragmentary view of the lock groove of the pin of FIG. 9 taken generally in the Circle 9A in FIG. 9.

A further modification of the structure of the helical lock grooves 26a of FIG. 8A but adapted for use with a pin having an internal drive is shown in the drawing of FIG. 9A. Thus in the description of the embodiment of FIG. 9A components similar to like components in the embodiments of FIGS. 1–4A and 8A have been given the same numeral designation with the addition of the letter postscript "b" and unless described otherwise can be considered to be substantially the same. As will be seen the depth of the roots is selected to be minimal to facilitate construction of the internal drive thread of adequate strength.

As best can be seen in FIG. 9A, the roots 62b of lock grooves 26b are of a wide and relatively more shallow construction and have roots 62b with a generally streamlined configuration. The roots 62b, which are separated by annular shoulders 60b, can be considered to be defined by a root portion 72b at the base of the root 62b, which is connected at one end to a leading transition or flank portion 64b and at the opposite end to a trailing transition or flank portion 66b. In order to approximate a streamlined shape, the root portion 72b is generally broadly arcuately shaped.

In addition to the above, the lock grooves 26b are further defined by the following:

1. Pb is the pitch between successive lock grooves 26b;
2. hb is the thread depth of roots 62b;
3. Drb is the effective root diameter of thread roots 62b;
4. Dub is the crest diameter of the thread crests 71b of pin shoulders 60b.

In one form of the invention, the trailing transition portion 66b and leading transition portion A1b were provided to be at the same steep angles Atb and A1b of around 20° with a plane transverse to the axis of pin 12b. The leading and trailing transition portions were joined at the crest 71b by a relatively large radius R6.

The grooves 26b are of a pitch Pb which is substantially the same as pitch Pa of grooves 26a and thus is also approximately 40% greater than pitch P of grooves 26 and 133% greater than pitch P' of grooves 126. This results in fewer crests 71b being engaged per unit length by the collar shank, such as shank 61, in swage resulting in a decrease in swage load. Because of the increased pitch Pb and general uniformity of the root portion 72b the shallow depth hb can be provided while still having a generally smoothly, radiused connection to the leading and trailing transition portions 64b, 66b.

It should be noted that leading transition portion 64b and trailing transition portion 66b are each connected to the root portion 72b by reduced radius R7 whereby the adjacent sections of the root portion are slightly, offset axially and radially. This assists in reducing the swage load by providing space for the collar material as it is swaged over the crests 71b. In this regard, in one construction, the radius R7 was located from crest 71b at approximately 60% of the depth hb. At the same time the ratio of effective crest width Wcb to effective groove width Wgb for lock grooves 26b was around 16% which is less than the corresponding ratios for fastener 10 and 10a. This assists in a further reduction in the magnitude of swage load. The steep angles A1b and Atb of the leading and trailing transition portions 64b and 66b and the offset of radius R7 facilitates flow of the material of collar 14b in swage while still providing a buttressing effect to contain the swaged collar material as noted before.

The flow of the material of the collar, such as collar 14, during swage is also assisted by the generous radius R6 of crests 71b.

Since, as noted, the pitch Pb of the lock grooves 26b is greater than the pitch P of lock grooves 26 a slightly longer collar shank, such as shank 24, is required to assure that a sufficient number of pin shoulders 60b are engaged to provide and hold the desired clamp load.

Here the depth of fill of roots 62b at swage is approximately 50% to 70% of depth hb. As noted the depth hb of roots 62b is significantly less than the depth ha of the roots 62a of the combination lock and pull grooves 26a of pin 12a (FIG. 8A) when helically formed and used as combination lock and pull grooves, and the depth h of the roots 62 of grooves 26 of pin 12 (FIG. 4A). As shown in FIGS. 9 and 9B, the depth hb is selected to facilitate the formation of internal, helical pull grooves of adequate strength for internal drive.

Thus looking now to FIGS. 9 and 9B, the pin 12b has a bore 75 at the end of the shank 15b. The bore 75 is provided with a plurality of helical pull grooves 77. The helical pull grooves 77 are provided with crests 78 which are wider than the roots 79. This provides a relatively wider shear area for engagement by the mating threads of the threaded spindle. The threaded spindle can be of a higher strength ferrous material than the pin 12b and thus will require less shear area across the engaging threads than the internal pull threads 77. In one form of the invention the width of the crests 78 was approximately 50% longer than the width of the roots 79.

It can also be seen that the depth hb of grooves 26b assists in providing a maximum radial wall thickness t5 between the crests 79 of the internal pull threads 77 and the root portions 72b of the external grooves 26b. This then provides the area of the shank 15b of the threaded bore 75 with sufficient compressive strength to withstand the swage loads on the collar such as collar 14.

The above noted features, contribute to the reduced magnitude of swage load which facilitates the use of internal drive by way of the pull threads 77.

It should also be noted that the helical thread form of the pull threads 77 of the bore 75 is of an opposite hand from that of the helical form of the lock grooves 26b. Thus during installation, if the pin 12b starts to spin in the workpiece openings, the left hand helical thread form of pull threads 77 will spin the pin 12b clockwise which tends to tighten the pin 12b into the limited thread of a collar such as collar 14d, e or f, to be described. Thus there will be no tendency to loosen the pin 12b from the collar during initial engagement. In this regard, it should be noted that with the internal drive provided by the threaded bore 75 the lock grooves 26b could be annular, instead of helical, but be substantially of the same contour and root depth for the reasons given. In this case the collar 14c, to be described, with the flexible tab 90 could be used for initial pre-assembly.

The following chart lists the typical dimensions for the pin 12b, for use with a corresponding collar such as collar 14, and a swage anvil, with a swage section such as swage anvil section 56. The dimensions are provided, however, for a Grade 5 fastener of a ⅝ inch nominal diameter with typical, average performance values.

| PIN 12b, COLLAR GRADE 5, NOMINAL DIA. ⅝ INCH | | | | | | | |
|---|---|---|---|---|---|---|---|
| Pin Crest Dia.-Dub | Root Depth- hb | Crests per inch | $\dfrac{Wcb}{Wgb}$ | t5 | Pitch Pb | Angle A1b | Angle Atb |
| .622 | .020 | 8 | .162 | .065 | .130 | 20° | 20° |
| hb/Dub × 10² | Root Dia. Drb | Final Clamp Force | Percent Fill - Swaged | | Snub Load | Swage Load | Final Tensile |
| 3.29 | .581 | 21,000 | 50% | | 6,000 | 10,500 | 29,810 |

Thus, considering the different forms of the invention, it is believed that a ratio of effective width of pin crests to effective width of pin grooves of between around 0.150 to around 0.30 is desirable for fastener pins of a nominal diameter of from ½ inch to ¾ inch. The ratios noted could be slightly smaller or larger for fastener pins having larger and smaller nominal diameters and thus the concepts taught herein can be extended to fasteners having a wide range of nominal diameters.

As noted the performance of the fastening system of the present invention as shown and described is significantly improved relative to the prior, conventional fasteners of FIGS. 7 and 7A. While the preceding charts of comparative data show this, the significant improvement is further illustrated in the graphs of FIGS. 12A–12D. Each of these graphs depict swage load in solid lines and the resultant clamp load in dotted lines versus time. All of the graphs are for the same sized, ⅝ inch, fastener of comparable Grade 5 with the graph of FIG. 12A being the fastener of FIGS. 1–4A, 5 and 6, the graph of FIG. 12B being the fastener of FIGS. 8 and 8A, the graph of FIG. 12C being the fastener of FIGS. 9, 9A and the graph of FIG. 12D being the conventional fastener of FIGS. 7 and 7A. It can be seen that the performance values on the graphs may vary somewhat from the typical, average performance values noted on the charts.

Figure 12A:
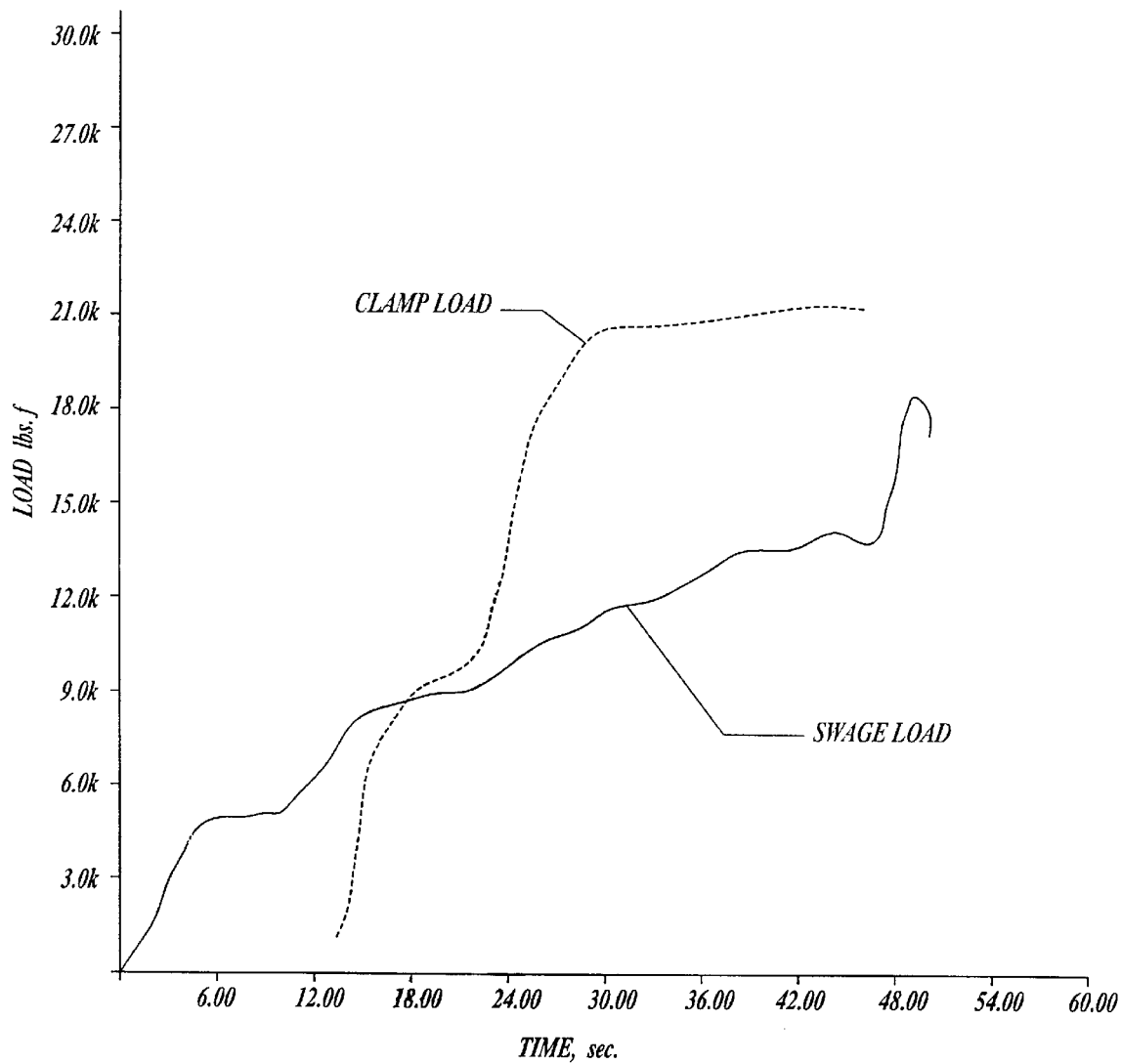
FIGS. 12A, 12B, 12C and 12D are graphical representations depicting the swage load and resultant clamp load versus time of the fastening systems for a ⅝ inch diameter fastener of FIGS. 1–4A, 5, 6 (FIG. 12A), of FIGS. 8, 8A (FIG. 12B), of FIGS. 9, 9A (FIG. 12C) and of the prior art of FIGS. 7, 7A (FIG. 12D)
Figure 12B:
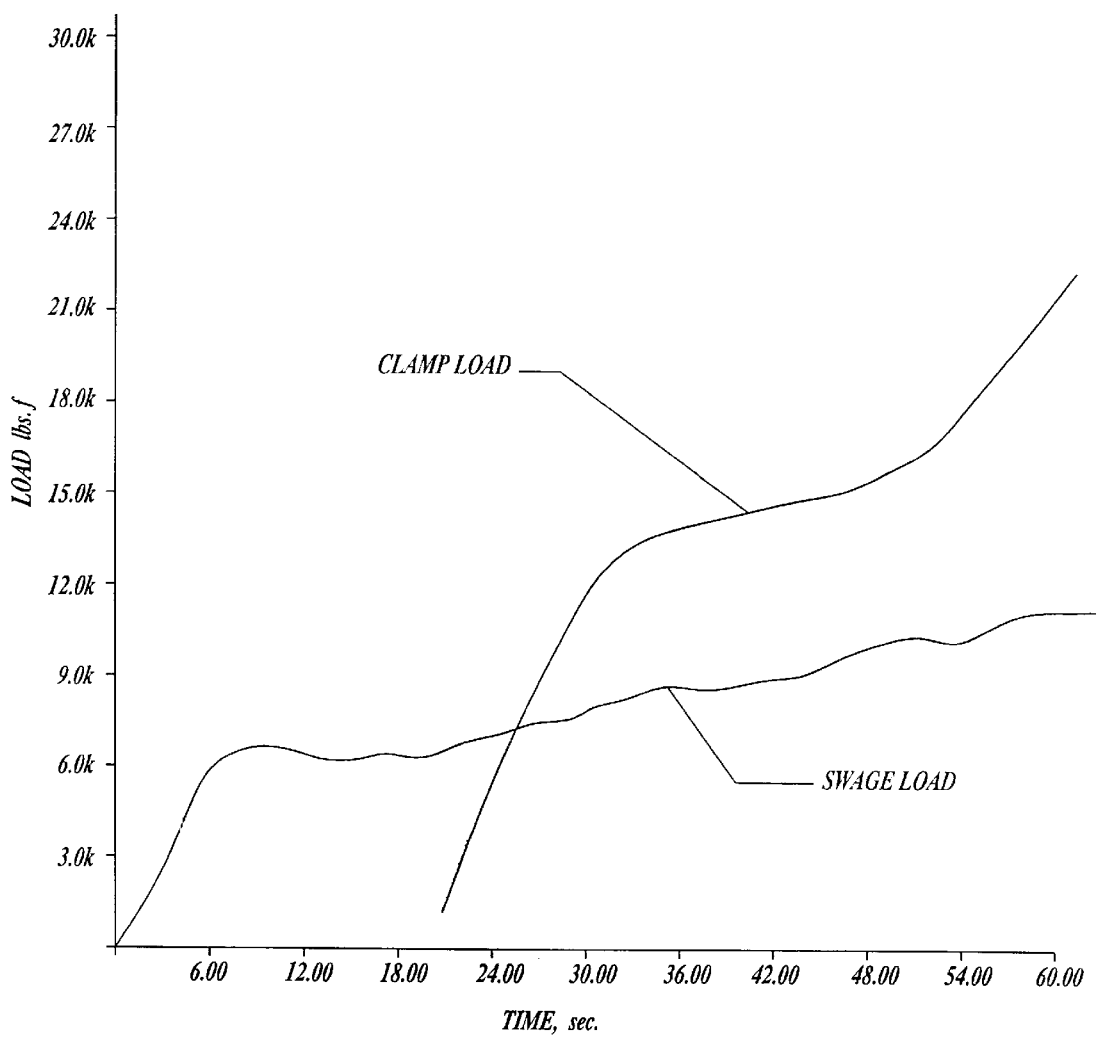
Figure 12C:
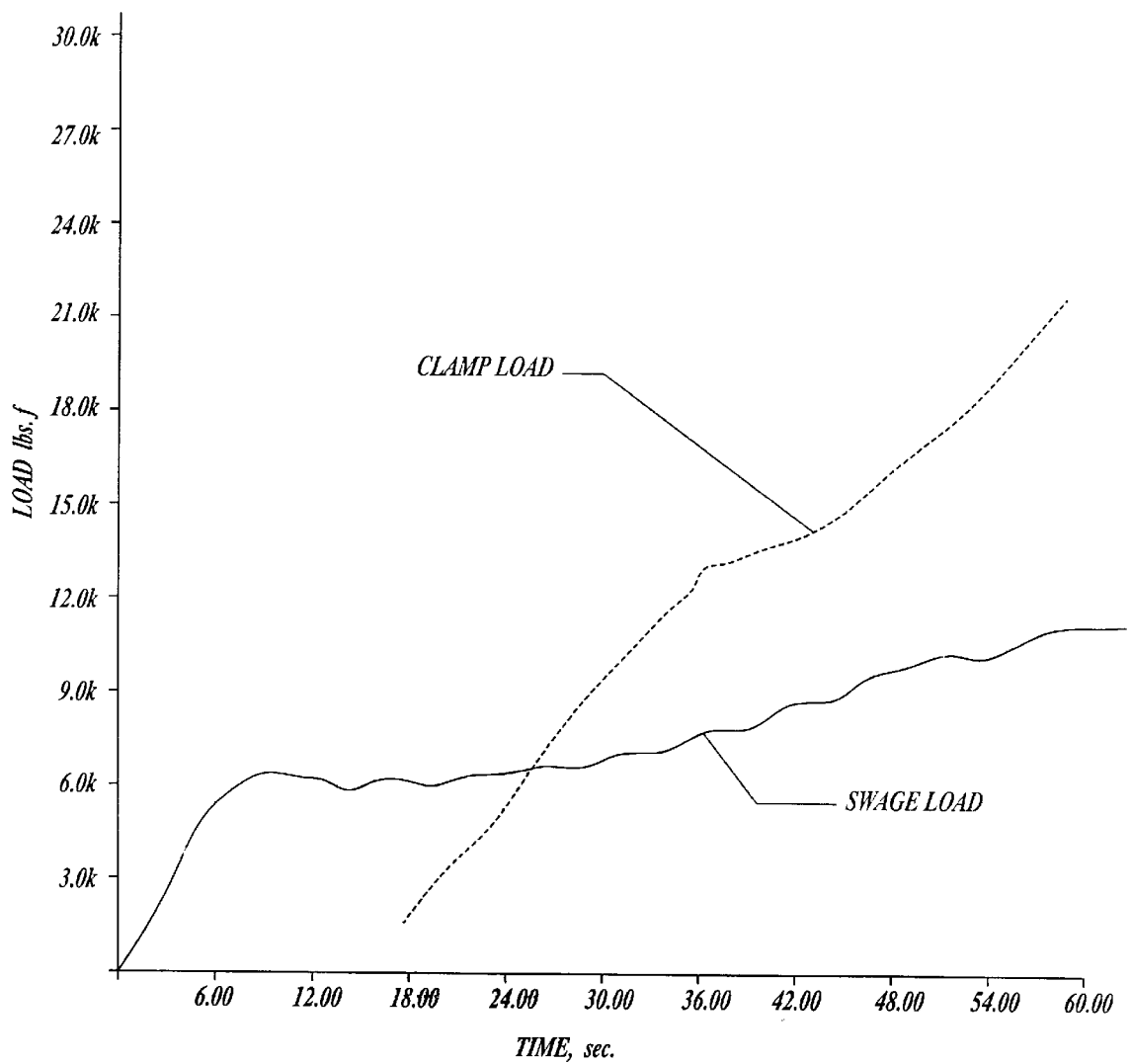
Figure 12D:
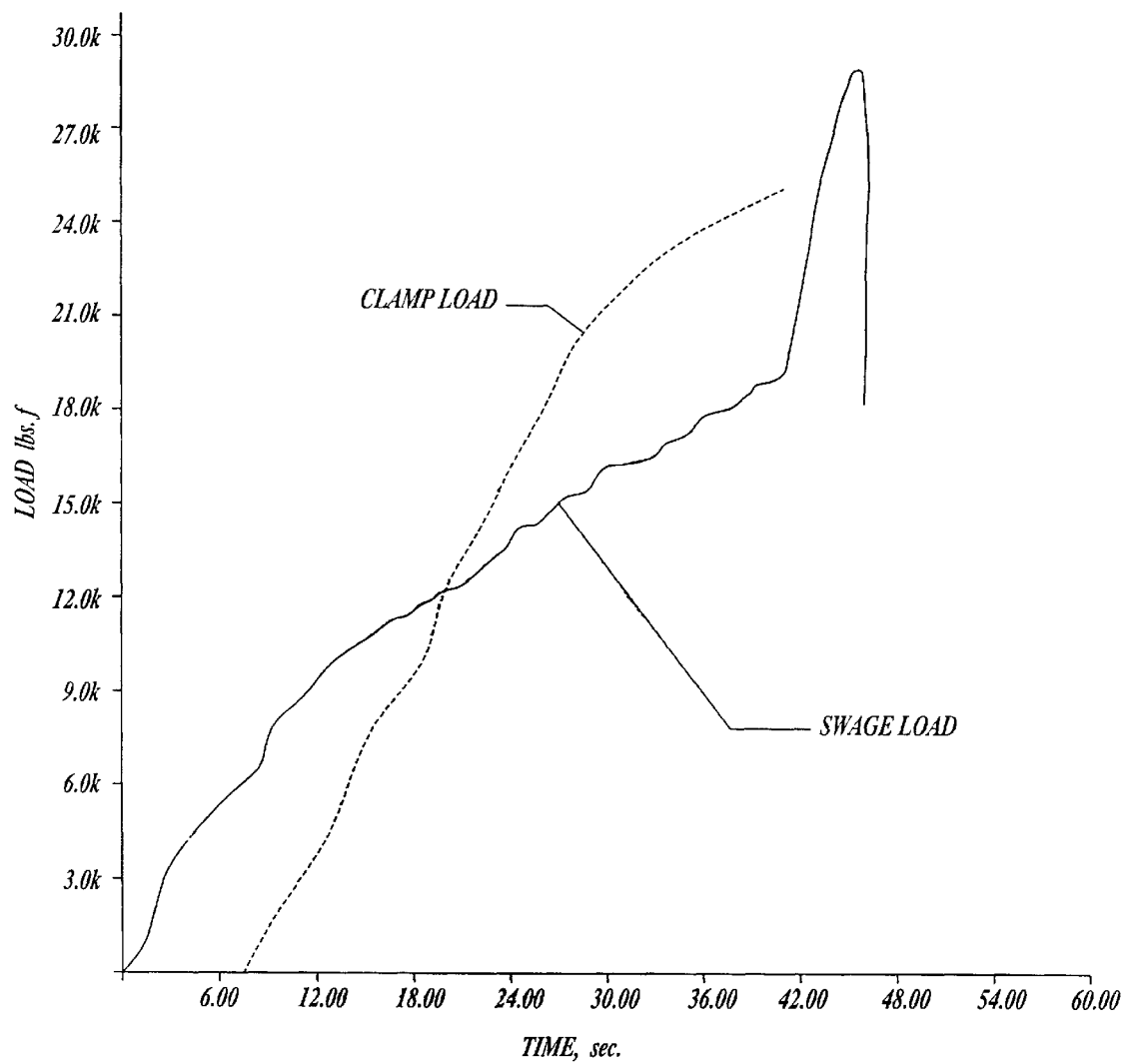

It can be seen in FIG. 12A that for the fastener 10 a clamp load of 20,000 to 23,000 pounds on the workpieces is reached with a swage load of around 13,400 pounds. FIG. 12B shows that for the fastener 10a a clamp load of 22,000 pounds is attained with a swage load of around 11,000 pounds. FIG. 12C shows that for the fastener with lock grooves 26b a clamp load of 24,000 pounds is attained with a swage load of 10,500 pounds. However, FIG. 12D shows that for the comparable, conventional fastener 110 a clamp load of 21,000 pounds is attained with a swage load of around 18,500 pounds. The further rise in swage load and clamp load thereafter shown in the graphs of FIGS. 12A and 12D is a result of the extra magnitude of load required for pin break, i.e. to around 27,000 pounds for the fastener 110 of FIG. 12D compared to around 18,000 pounds for the fastener 10 of FIG. 12A.

It is significant to note that the performance graphs of FIGS. 12A–12C show swage load curves with a significantly lower slope than that of the conventional fastener 110 as shown in FIG. 12D. In fact the swage load curves of the graphs of FIGS. 12B and 12C of lock grooves 26a and 26b are of even a lower slope and are substantially flat as a result of wider pitches Pa and Pb and lower ratios of Wca/Wga and Wcb/Wgb. The reduced areas under the swage curves of FIGS. 12A–12C show the significant overall reduction in energy required for swage in contrast to the swage curve of FIG. 12D of the conventional fastener.

In view of the fasteners made in accordance with the present invention and having pull portions and/or pintails of reduced size and/or length, it may be desirable to provide means for holding the pin and collar together when first pre-assembled to workpieces in preparation for installation. Thus the collar could be provided with a flexible pre-assembly tab generally as shown in U.S. Pat. No. 4,813,834 to Smith, issued Mar. 21, 1989. Such a construction is shown in the collar as depicted in FIG. 10. In the description of the collar of FIG. 10 components similar to like components of the swage anvil section 56 in the collar 14 as shown in FIGS. 1–6, are given the same numeral designations with the addition of the letter postscript "c" and unless described otherwise are of the same construction.

Looking now to FIG. 10, the collar 14c includes an enlarged diameter flange 59c with a cylindrical shank 61c and a through bore 65c. The collar shank 61c is of a generally uniform cylindrical configuration with a generally uniform wall thickness and has a straight shank portion 69c which terminates at its outer end in a radially outwardly flared shank portion 67c, which provides a hold-off function as previously described. The through bore 65c has a straight bore portion 49c of generally uniform diameter which terminates proximate the flange 59c in an enlarged countersunk bore portion 55c. The flanged collar 14c is adapted to be located over the pin shank with the flange 59c in engagement with an outer surface of a workpiece.

An assembly tab 90 is located in the countersunk bore portion 55c and is of a limited circumferential length. The assembly tab 90, as noted in the '834 patent, supra, is of a flexible construction and as such can be made of a plastic material such as polyurethane. The tab 90 extends radially inwardly a distance sufficient to be located within the lock grooves such as grooves 26. In this way, once located in one of the lock grooves, the collar 14c will be held onto the associated pin. The tab 90 is located within the countersunk bore portion 55c which is at a point in line with the flange 59c. Since flange 59c is not swaged during installation this location of the tab 90 will have no effect on the fill of the lock grooves with the material of the collar shank 61c when swaged. The tab 90 is of a generally triangular configuration extending radially inwardly to a reduced width. This facilitates movement of the collar 14c onto the pin and the indexing of the tab 90 over the lock groove crests. It should be understood, of course, that the tab 90 could as well be located at the opposite end of the collar 14c. The tab 90 is especially useful with lock grooves that are annular such as grooves 26 of FIG. 4A; however, collar 14c with tab 90 could also be used with lock grooves that are helical such as helical lock grooves 26b of FIG. 9A for an internal drive type fastener with pin 12b when the tab 90 is located adjacent flange 59d.

With regard to the helical lock grooves of FIGS. 8, 8A, 9 and 9A a pre-assembly or fit-up type limited thread could be used such as illustrated in U.S. Pat. No. 4,867,625 to Dixon, issued Sep. 19, 1989. Here the pre-assembly thread is formed by upsetting one end of the collar to form a radially inwardly extending limited thread. In this construction the collar with such limited thread can be pre-assembled to the pin by a threaded action onto the helical lock grooves. Again such a limited thread could be formed at either end of the collar.

Such a construction is shown in the collar as depicted in the fragmentary view of FIG. 11. In the description of the collar of FIG. 11 components similar to like components in the collars 14 and 14c as shown in FIGS. 1–6 and 10 are given the same numeral designations with the addition of the letter postscript "d" and unless described otherwise are of the same construction.

Looking now to FIG. 11, the collar 14d includes an enlarged diameter flange 59d with a cylindrical shank 61d and a through bore 65d. The collar shank 61d is of a generally uniform cylindrical configuration with a generally uniform wall thickness and has a straight shank portion 69d which terminates at its outer end in a radially outwardly flared shank portion such as shank portion 67, which provides a hold-off function as previously described. The through bore 65d has a straight bore portion 49d of generally uniform diameter which terminates proximate the flange 59d in an enlarged countersunk bore portion 55d.

The flanged collar 14d is adapted to be located over a pin shank, such as pin shank 15a, 15b with the flange 59d in engagement with an outer surface of a workpiece. A female collar thread 90d of a limited circumferential length is formed proximate the countersunk bore portion 55d. The limited pre-assembly thread 90d, as noted in the '625 patent, supra, is of a metallic structure formed integrally at the juncture of the straight bore portion 49d with the countersunk bore portion 55d. The limited thread 90d extends radially inwardly a distance sufficient to threadably engage the helical lock grooves such as grooves 26a, 26b. In this way, once located in one of the lock grooves, the collar 14d will be held assembled onto the associated pin similarly with the resilient assembly tab 90. This location of the limited thread 90d will have little or no effect on the fill of the lock grooves with the material of the collar in swage. It should be understood, of course, that the limited thread 90d could as well be located at the opposite end of the collar 14d and substantially in line with the flared portion such as 67.

The limited thread 90d can be of a preselected extent such that some magnitude of initial clamp of the workpieces can be attained in addition to holding the collar 14d and associated pin in a pre-assembled condition with the workpieces. However, in accordance with the '625 patent, supra, the female collar thread 90d is selected to be of a limited circumferential extent and shear strength such that the collar 14d can be brought to its final, desired clamp position and swaged to the pin via the installation tool, such as tool 48. Thus the female collar thread 90d is selected such that, in response to the relative axial force and at a level prior to the initiation of collar snub or swaging into the lock grooves of the pin, it will shear or deform such that the collar 14d will be free to move axially over the pin and to respond to the installation loads in substantially the same manner as a collar without such limited female thread 90d. Now the workpieces can be finally clamped together with the same effectiveness as the swage type fasteners previously described. In one form of the collar 14d it is believed that the limited collar thread 90d could extend for no more than around one pitch, i.e. 360°. The collar 14d with limited thread 90d located adjacent the flange 59d would be especially useful with helical lock grooves such as grooves 26b of FIG. 9A for the internal drive type fastener with pin 12b.

A modified pre-assembly or fit-up type limited thread in the form of a metal tab generally of a size shown in FIG. 10 could be used. Again the pre-assembly thread tab is formed by upsetting one end of the collar to form a radially inwardly extending limited thread in the form of a tab. In this construction the collar with such limited thread tab can be pre-assembled to the pin by a threaded action onto the helical lock grooves. Such a limited thread tab could be formed at either end of the collar.

Such constructions are shown in the portion of the collars as depicted in FIGS. 11A and 11D. FIG. 11A shows the thread tab formed at the back or flange end of the collar while FIG. 11B shows the thread tab at the front of the collar. In the description of the collars of FIGS. 11A and 11B components similar to like components in the collars 14, 14c as shown in FIGS. 1–6 and 10 are given the same numeral designations with the addition of the letter postscript "e" for the embodiment of FIG. 11A and letter postscript "f" for the embodiment of FIG. 11B and unless described otherwise are of the same construction.

Looking now to FIGS. 11A, 11B, the collar 14e, f includes an enlarged diameter flange such as 59, i.e. 59e, with a cylindrical shank 61e,f and a through bore 65e,f. The collar shank 61e,f is of a generally uniform cylindrical configuration with a generally uniform wall thickness and has a straight shank portion 69e,f which terminates at its outer end in a radially outwardly flared shank portion such as shank portion 67, i.e. shank portion 67f, which provides a hold-off function as previously described. The through bore 65e,f has a straight bore portion 49e,f of generally uniform diameter which terminates proximate the flange such as flange 59, i.e. 59e, in an enlarged countersunk bore portion such as 55, i.e. 55e.

The flanged collar 14e,f is adapted to be located over a pin shank, such as pin shank 15a with the flange such as 59, i.e. 59e, in engagement with an outer surface of a workpiece. The limited pre-assembly thread tab 90e,f is of a metallic structure formed integrally in the bore portion 49e,f with the tab 90e formed at the juncture of the straight bore portion 49e, with the countersunk bore portion 55e as in FIG. 11A, or the thread tab 90f formed at the juncture of flared shank portion 67f and straight bore 49f as in FIG. 11B. The thread tab 90e,f extends radially inwardly a distance sufficient to threadably engage the helical lock grooves such as grooves 26b,c. In this way, once located in one of the lock grooves, the collar 14e,f will be held assembled onto the associated pin similarly as with the resilient assembly tab 90. The limited thread tab 90e,f is of a limited circumferential extent and shear strength such that the collar 14e,f can be brought to its final, desired clamp position and swaged to the pin via the installation tool, such as tool 48, at a load level prior to the initiation of collar snub or swaging into the lock grooves of the pin. Thus it will shear or deform such that the collar 14e,f will be free to move axially over the pin and to respond to the installation loads in substantially the same manner as a collar without such limited thread tab 90e,f. Now the workpieces can be finally clamped together with the same effectiveness as the swage type fasteners previously described.

The thread tab 90e located at the flange end would be especially useful with the helical lock grooves 26b for the internal drive fastener with pin 12b. However, the collar 14f with the metal tab 90f at the outer shank end would be especially useful with the helical lock and pull grooves 26 of FIG. 4A.

Figure 13:
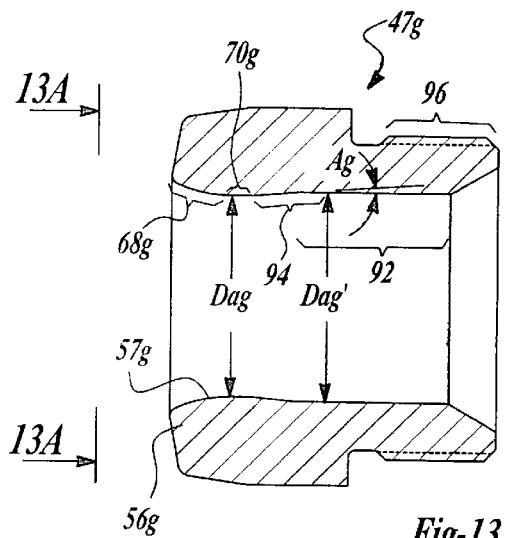
FIG. 13 is a longitudinal sectional view of a swage anvil having a modified form of swage cavity.
Figure 13A:
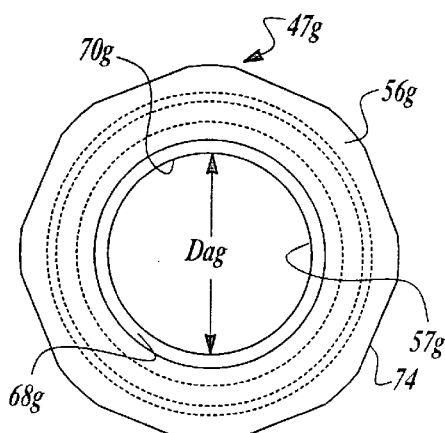
FIG. 13A is an end view of the swage anvil of FIG. 13 taken generally in the direction of the Arrows 13A in FIG. 13.

As previously noted the configuration of the swage cavity assists in providing the desired hold-off while promoting the uniform radially inward flow of the material of the collar shank such as shank 61 during swage. A modified form of swage anvil and swage cavity, especially useful with the form of fastener to be installed with external helical lock and pull grooves, as shown in FIGS. 8 and 8A or internal pull grooves as shown in FIGS. 9 and 9B with lock grooves such as in FIG. 9A. The modified swage anvil and swage cavity is shown in FIGS. 13 and 13A. In the discussion of the swage anvil of FIGS. 13, 13A components similar to like components of the swage anvil 47 in the embodiment of FIGS. 1, 2 and 4 are given the same numeral designation with the addition of the postscript "g" and unless described otherwise are generally of the same construction. Thus the swage anvil 47g has a swage anvil section 56g having a swage cavity 57g with a straight, relief bore portion 92 of a substantially uniform diameter at its inner end. A lead-in portion 68g at the outer end of the swage cavity 57g extends radially inwardly to the short straight swage bore portion 70g. The lead-in portion 68g is generally arcuately shaped and is connected to the relatively short axially straight swage portion 70g which defines the minimum swage diameter Dag. The outer lead-in end 68g curves radially outwardly in the same manner as the arcuate lead-in end 68 of anvil 47 to initially provide an essentially circumferential line contact with the radially outer end surface of the flared collar shank portion such as portion 67 of collar 14. See FIG. 13. Thus the arcuate lead-in end 68g operates the same as the lead-in end 68 with the flared collar shank portion 67 which extends radially outwardly to engage the curvature of the arcuate end 68g to assist in providing a minimal lead-in distance, such as distance dd in FIG. 4, and at the same time to promote a desired magnitude of hold-off. The line of contact of the flared collar shank portion such as 67 was at a point on the arcuate end 68g which also defined a relatively shallow angle such as angle Ac in FIG. 4.

The anvil cavity 57g is provided with the straight, relief cavity portion 92 of substantially uniform diameter Dag' which is slightly greater than diameter Dag. In the present invention, the straight bore portion 92 of the swage cavity 57g while of a sufficient axial length to overlap the collar shank 61 is in clearance relationship and does not engage the spring back of the radially inwardly swaged portion of the collar shank 61. The swage diameter Dag for swage portion 70g is the same as the diameter Da for swage portion 70 of anvil 47. Thus the maximum amount of swaging is performed by the relatively short, axially straight swage portion 70g which in one form for installing a ⅝ inch fastener was around 0.100 inches in length. At the same time the diameter Dag for the ⅝ inch fastener was 0.939 inches with relief diameter Dag' being around 0.974 inches.

However, the short, straight swage portion 70g is connected to the straight bore portion 92 by a tapered connecting relief portion 94 which extends axially rearwardly and radially outwardly at a slight angle Ag of around 5° relative to the central axis of the swage cavity 57g'. The slight angle of the tapered connecting portion 94 provides a gradual distribution over a relatively large area of the collar material which has sprung back after swage and is adjacent to the straight swage portion 70g. Thus it is believed that such a reduced angle of inclination and greater area of load distribution inhibits the formation of a large volume of spring back of collar material near the inner end of the swage portion 70g and thus facilitates removal of the swage anvil section 56g from the swaged collar and ironing of the collar material which has sprung back after swage without flaking or removing coating from the collar. In addition the swage anvil 47g can perform the swaging operation at reduced swage loads.

As noted the anvil 47g, because of its low swage loads, is especially useful with fasteners having collars, such as collar 14, and pins having lock grooves 26a of FIGS. 8A for a pin 12a, which also function as pull grooves for external drive and lock grooves 26b of FIG. 9A for a pin 12b having an internal drive. The swage anvil 47g has a threaded shank portion 96 to facilitate its attachment and removal from an anvil housing such as 54. At the same time the outer surface 74 can be irregularly shaped to assist in such attachment and removal.

Figure 14:
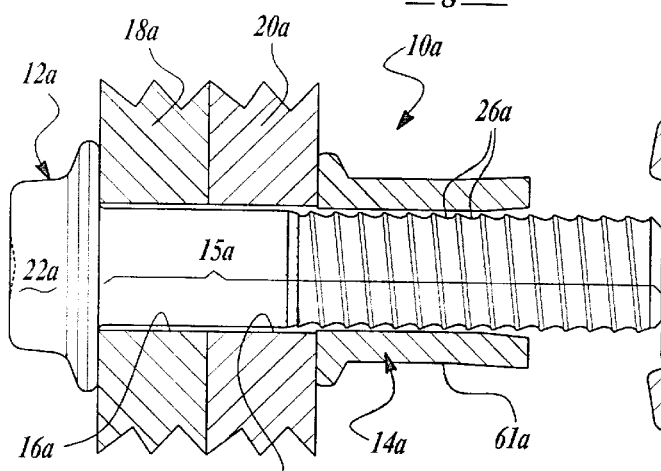
FIG. 14 is a longitudinal elevational view with some parts shown broken away and others shown in section of an installation tool including a swage anvil of FIGS. 13 and 13A and in pre-assembly relationship with a fastener including a pin member having helical lock and pull grooves of a type shown in FIGS. 8 and 8A.
Figure 15:
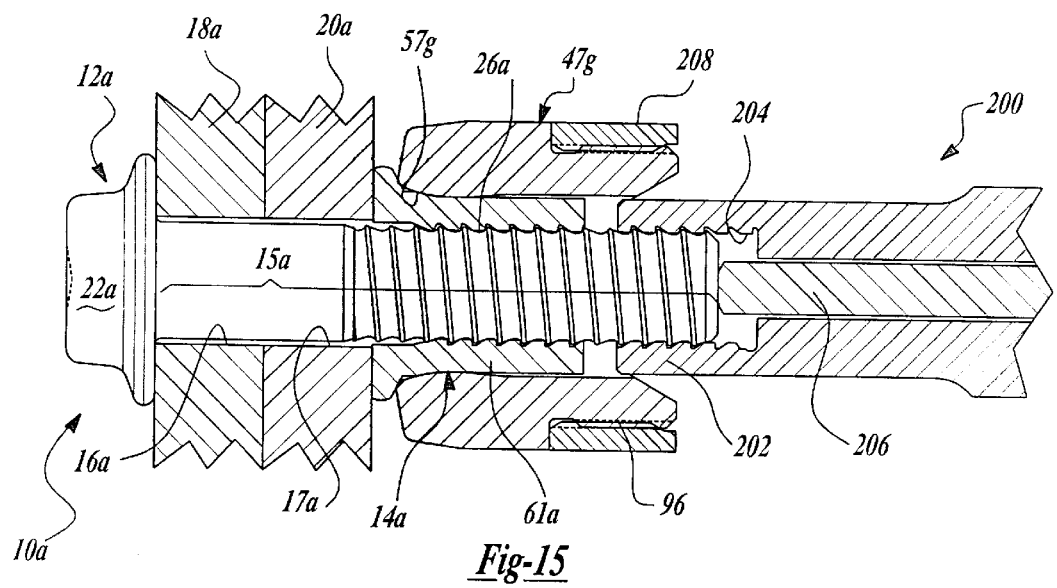
FIG. 15 is a view similar to FIG. 14 showing the fastener and installation tool of FIG. 14 in the fully swaged condition.
Figure 16:
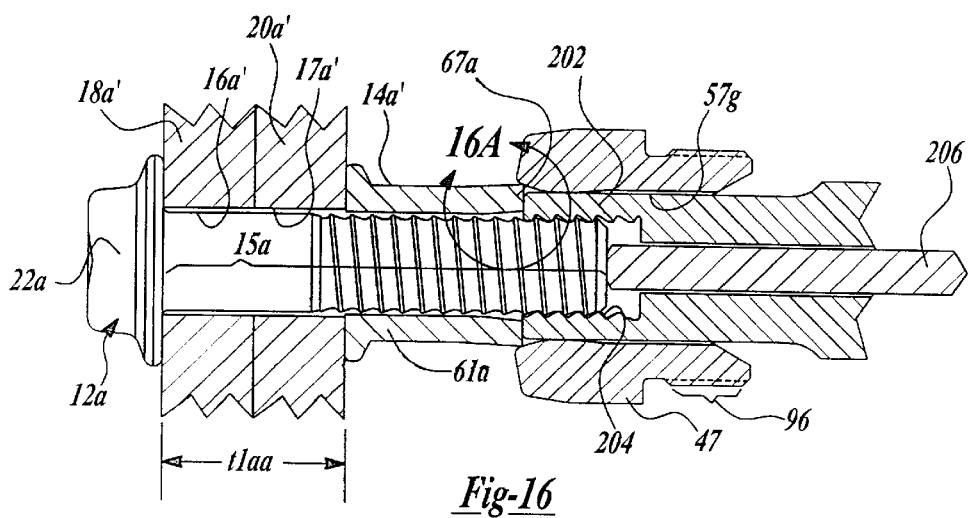
FIG. 16 is a view similar to FIG. 15 but depicting the installation tool in preassembly relationship with a fastener including a pin member having helical lock and pull grooves of a type shown in FIGS. 8 and 8A with the fastener shown for fastening workpieces having a maximum total thickness in which the nut member is engaged with the collar shank prior to initiation of swage.
Figure 16A:
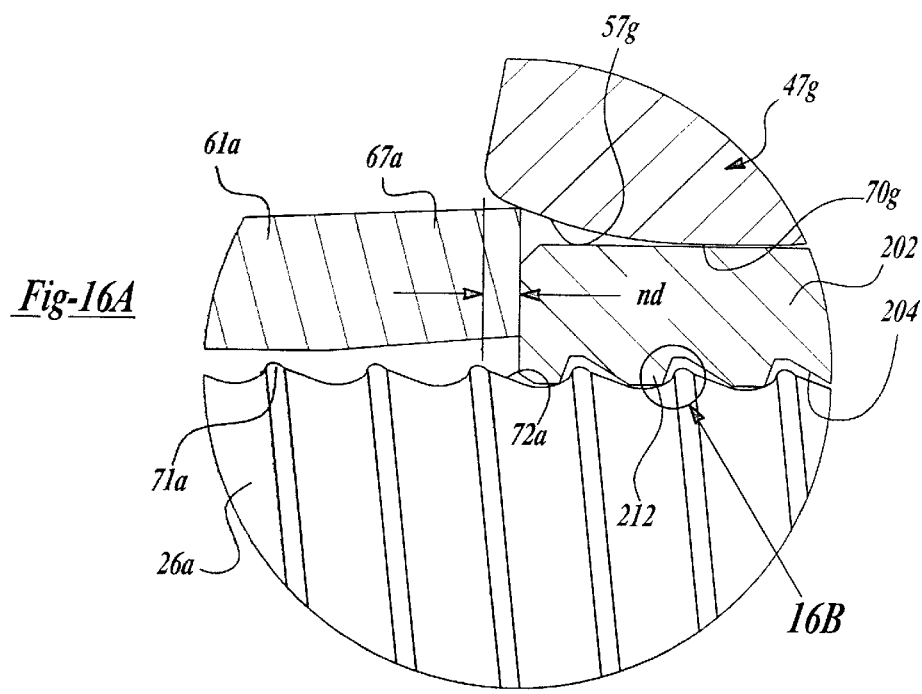
FIG. 16A is an enlarged view of the portion of the assembly of FIG. 16 taken generally in the Circle 16A.
Figure 16B:
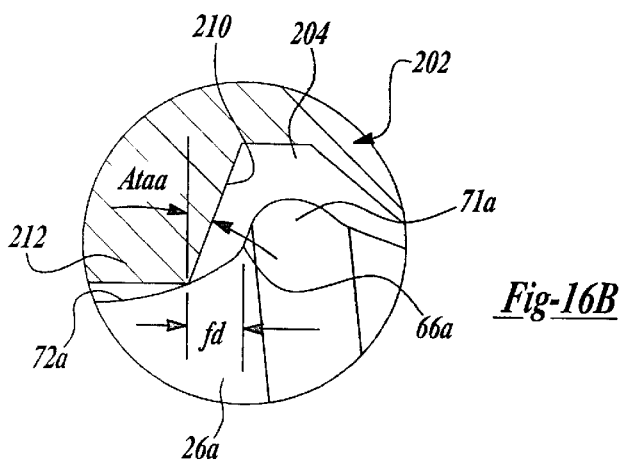
FIG. 16B is an enlarged view of the assembly of FIG. 16A taken generally in the Circle 16B.
Figure 16C:
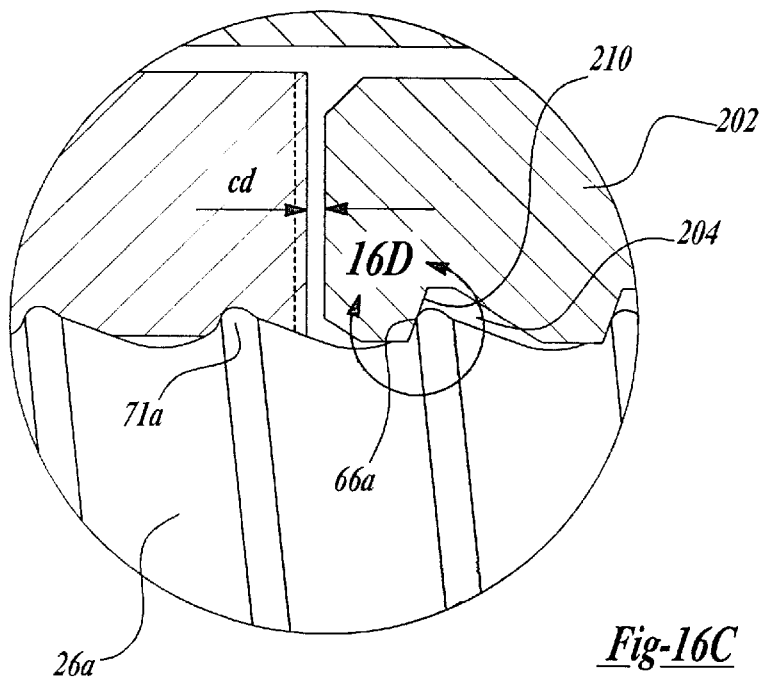
FIG. 16C is a view similar to FIG. 16A but depicting the assembly at the completion of swage.
Figure 16D:
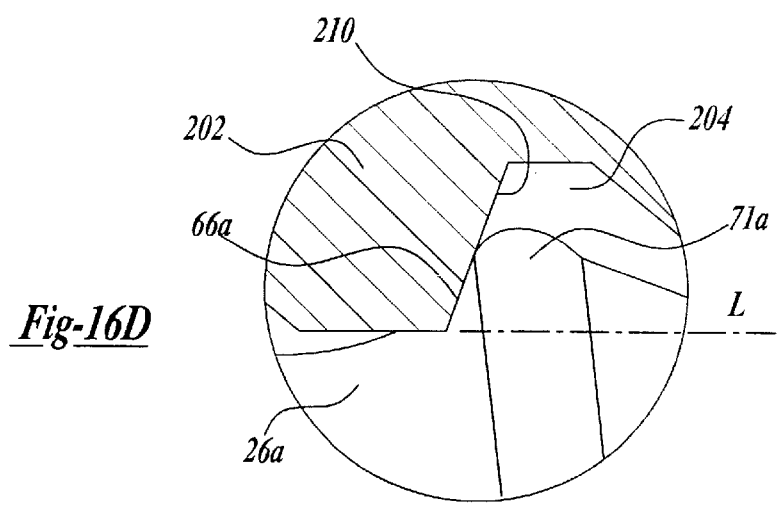
FIG. 16D is an enlarged view similar to FIG. 16B and taken in the Circle 16D of FIG. 16C.
Figure 17:
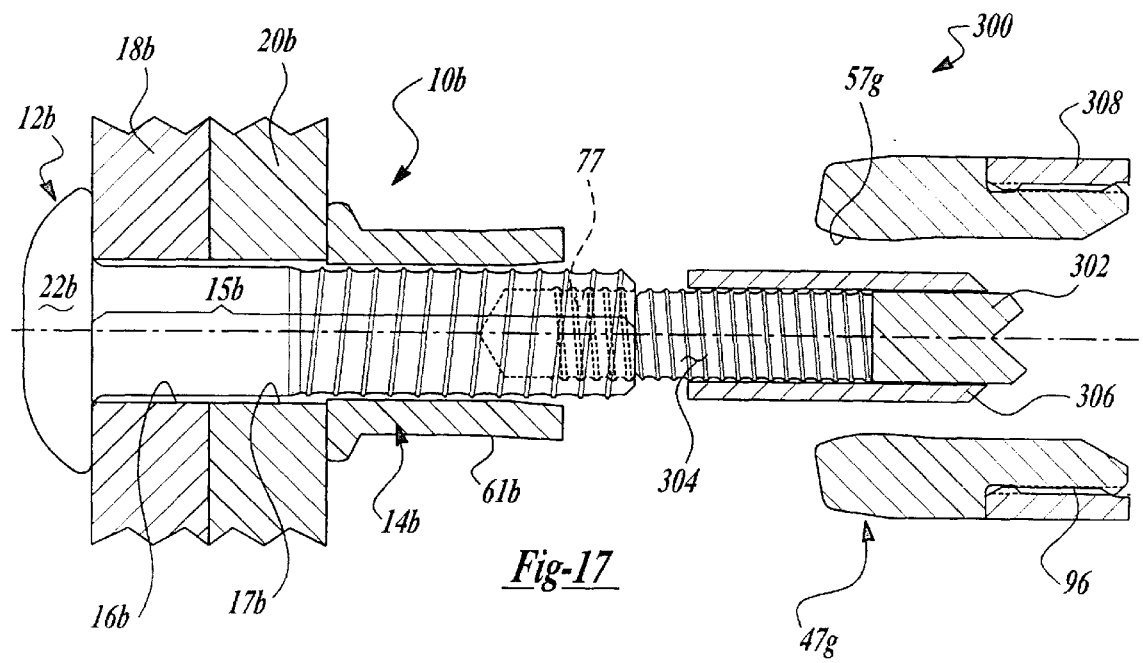
FIG. 17 is a longitudinal view with some parts shown broken away and others shown in section of an installation tool for internal drive and including a swage anvil of FIGS. 13 and 13A and in a pre-assembly relationship with a fastener including a pin member having helical lock grooves and internal helical pull grooves of a type shown in FIGS. 9, 9A and 9B.

FIGS. 14, 15, 16 and 16A–16D illustrate a tool 200 (partially shown) with the anvil 47g for setting the fastener with pins 12a having combined lock and pull grooves 26a for external drive while FIGS. 16 and 17 illustrate a tool 300 (partially shown) with the anvil 47g for setting the fastener with pins 12b having lock grooves 26b and helical pull grooves 77 for internal drive. In the embodiment shown in FIGS. 14, 15, 16 and 16A–16D and in the embodiment of FIGS. 17 and 18 components which are similar to like components which have been previously described are given the same numeral designation and unless described otherwise can be considered to be essentially the same. The installation tools of the two noted embodiments can be similar in structure and operation to that described in the '755 patent, supra, and hence the details thereof have been omitted for purposes of simplicity.

Referring to FIGS. 14, 15, 16 and 16A–16D there is shown a tool 200 for installing the fastener 10a which includes the pin 12a and collar 14a. The pin 12a includes an enlarged head 22a and a pin shank 15a adapted to be received in aligned openings 16a and 17a in workpieces 18a and 20a, respectively, as shown in FIGS. 14 and 15 or in aligned openings 16a' and 17a' in thicker workpieces 18a' and 20a', respectively, as shown in FIGS. 16 and 16A–16D. The collar 14a is identical to collar 14.

The tool 200 comprises a rotary nut or threaded thimble member 202 having internal gripping threads 204 sized to threadably engage the helical lock and pull grooves 26a. The tool 200 includes the annular anvil member 47g with the swage cavity 57g receiving the nut member 202. The anvil member 47g is connected to an outer, anvil housing 208 via the threaded portion 96 with the anvil member 47g adapted for axial movement relative to the nut member 202 and to the sensing rod 206, to be described.

FIG. 14 shows the tool 200 relative to the fastener 10a prior to initiation of installation. FIG. 15 shows the tool 200 after the nut member 202 has been threaded to a predetermined position onto the lock grooves 26a and the tool 200 has been actuated to cause the anvil 47g to move axially forwardly relative to the nut member 202 to apply a relative axial force between the pin 12a and collar 14a moving the anvil swage cavity 57g axially to radially overengage the collar shank 61g to swage the collar material radially into the locking and pull grooves 26a of the pin 12a. After the swaging step has been completed the relative axial force between the anvil 47g and the nut member 202 is reversed whereby the swaged collar shank 61g is ejected from the anvil cavity 57g. The nut member 202 is now reverse rotated to remove it from the engaged pull grooves 26a and the installation is complete.

As noted the low swage loads for the fastener 10a permit the threaded engagement of a minimum number of helical lock grooves 26a by the gripping threads 204 of the nut member 202. This permits the pin shank 15a to be of a minimal length. The engaging flanks 210 of the threads 204 which engage the trailing lock groove flanks 66a are at an angle Ataa which is substantially the same as angle Ata of lock groove flanks 66a (see FIG. 16B). However, the flanks 210 of threads 204 are radially longer than lock groove flanks 66a and extend radially inwardly past the flanks 66a to engage the lock groove root 72a substantially at a point in line with the plane line L of FIG. 8A. Thus as seen in FIGS. 16A and 16B the flanks 210 of threads 204 initially are not fully engaged against the lock groove flanks 66a. However, as the relative axial force increases during swage the root 72a will be deformed along the plane line L until the flanks 210 of threads 204 are engaged with the lock groove flanks 66a. This provides additional clearance between the end of the nut member 202 and the outer end of the collar shank 61a. Thus in maximum grip conditions, where the workpieces such as workpieces 18a, 20a are of a maximum total thickness, backward extrusion from swage of the collar shank 61a into engagement against the nut member 202 can be avoided. This then assists in avoiding a tight lock up of the threads 204 of the nut member 202 with the lock groove flanks 66a by the force against the nut member 202 that could be caused by such engagement. Thus the axial distance fd of the flanks 210 of threads 204 from the lock groove flanks 66a when initially engaged at plane line L is selected to be greater than the amount of backward extrusion of the swage collar shank 61a. In one form of a ⅝ inch nominal diameter fastener the distance fd was selected to be around 0.010 inches.

This can be seen in FIGS. 16, and 16A–16D. Thus FIG. 16 shows a condition in which the workpieces 18a' and 20a' are of a maximum total thickness tlaa. Here then, prior to swage, the nut member 202 is engaged with the flared end 67a of the collar shank 61a. It can be seen from FIGS. 16A and 16B that in this pre-swage condition the crests 212 of the pull threads 204 are engaged with the roots 72a generally at a point in line with plane line L. This is sufficient engagement to facilitate initial, free threading of the nut member 202 onto the helical lock grooves 26a. Assuming that, when the nut member 202 is thus engaged with the flared end 67a of collar shank 61a that the sensing rod 206 detects sufficient threaded engagement then the swaging action will be initiated. This will result in an increased relative axial force applied between the nut member 202 and the swage anvil member 47g to swage the collar shank 61a into the lock grooves 26a. As this occurs the pull threads 204 will deform the engaged material of the root 72a until the pull thread flanks 210 move into engagement with the lock groove flanks 66a. This will move the end of the nut member 202 out of engagement with the end of the collar shank 61a a sufficient distance such that despite the rearward movement of the material of the collar shank 61a resulting from forward and backward extrusion during swage there will still be a gap between the confronting ends of the nut member 202 and swaged collar shank 61a. This can best be seen in FIGS. 16C and 16D where in FIG. 16C the dotted line 214 shows the preswaged location of the end of the collar shank 61a while the solid line shows its location after movement from extrusion after swage still leaving a clearance cd. The magnitude of clearance cd could vary with normal dimensional tolerances. Now, upon completion of the operation, the flanks 210 of nut member 202, not being forcibly clamped against the flanks 66a of the lock grooves 26a, the nut member 202 can be readily unthreaded from the helical lock grooves 26a. In this regard it can be seen that the axially offset location of the deepest point hp of the root 72a facilitates the desired location of the pull threads 204 within the roots 72a with the crests 212 generally in line with the plane line L. In this regard, it should be understood that somewhat similar engagement of pull thread crests with roots, such as roots 72 of helically formed lock grooves 26 of FIG. 4A, has been done. However, because of the uniform formation of the roots 72 and the relatively short depth relative to the flanks 66 such structures were sensitive to dimensional tolerance variations, wear and the like and were thus occasionally subject to failure and in addition required costly manufacturing procedures to maintain tight tolerances. Also with such prior structures, in order to avoid such lock up in a maximum grip condition, the end of the nut member could be located further in the swage cavity a greater distance from the end of the swage anvil to avoid the engagement of the end of the nut member with the end of the collar shank. This, however, would require that the length of the pin member be greater so that more pull grooves are accessible for engagement by the nut member in a maximum grip condition. In the present invention this spacing nd between the end of the nut member 202 and the end of the swage anvil 47g can be minimized because of the unique structure of the lock grooves 26a which provides significant tolerances for accommodating engagement of the nut member 202 with the collar shank 61a (see FIG. 16A).

Figure 18:
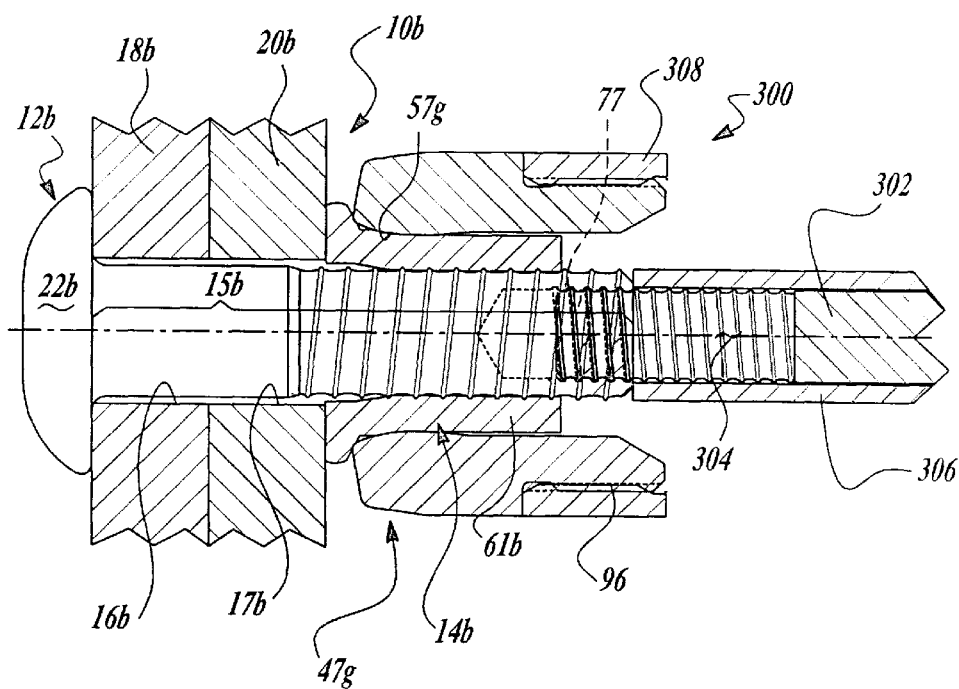
FIG. 18 is a view similar to FIG. 17 showing the fastener and installation tool of FIG. 16 in the fully swaged condition.

Referring to FIGS. 17 and 18 there is shown a tool 300 for installing the fastener 10b which includes the pin 12b and collar 14b. The pin 12b includes an enlarged head 22b and a pin shank 15b adapted to be received in aligned openings 16b and 17b in workpieces 18b and 20b, respectively. The collar 14b is identical to collar 14.

The tool 300 of FIGS. 17 and 18 comprises a rotary threaded spindle member 302 having external threads 304 sized to threadably engage the internal helical pull grooves 77. The tool 300 includes the annular anvil member 47g with the swage cavity 57g receiving the spindle member 302. The anvil member 47g is connected to an outer, anvil housing 208 via the threaded portion 96 with the anvil member 47g adapted for axial movement relative to the spindle member 302 and to the sensing rod 306, to be described.

FIG. 17 shows the tool 300 relative to the fastener 10b prior to initiation of installation. FIG. 18 shows the tool 300 after the spindle member 302 has been threaded to a predetermined position into the pull grooves 77 and the tool 300 has been actuated to cause the anvil 47g to move axially forwardly relative to the spindle member 302 to apply a relative axial force between the pin 12b and collar 14b moving the anvil swage cavity 57g axially to radially overengage the collar shank 61g to swage the collar material radially into the locking grooves 26b of the pin 12b. After the swaging step has been completed the relative axial force between the anvil 47g and the spindle member 302 is reversed whereby the swaged collar shank 61g is ejected from the anvil cavity 57g. The spindle member 302 is now reverse rotated to remove it from the engaged internal, pull grooves 77 and the installation is complete.

Also as noted in the '755 patent, the tools 200 and 300 could be constructed to provide a reduced load for gap pull out of workpieces, 18a, 20a and 18a', 20a' if a minimum number of pull grooves 26a engaged by the nut 202 or pull grooves 77 engaged by spindle member 302 is sensed. The amount of threaded engagement between the nut 202 or spindle member 302 and the pull grooves 26a, 77 can be determined by actuation of a sensing rod 206 or hollow sensing rod 306 adapted to engage the outer end of the pin shank 15a, 15b. Thus the amount of axial displacement of the sensing rod 206, 306 by engagement with the pin shank 15a, 15b will provide an indication of the amount of threaded engagement.

Thus the tool 200, 300 can be constructed so that the swaging operation or pull together will not be attempted until the system is assured that the nut 202 or spindle member 302 has been threaded a sufficient distance into grooves 26a, 77 to adequately resist the axial loads imposed by the swaging and or preliminary workpiece pull up operation.

The tools 200, 300 could also be constructed such that unless actuation of the pull up of the workpieces and/or swage action occurs within a preselected time the nut 202 or spindle member 302 will be unthreaded from the pull grooves 26a, 77 without application of a relative axial pulling force to the fastener 10a, 10b. See the '755 patent.

It should be noted that where the tool 200 is constructed with the gap pull out feature the relative construction of the pull grooves 26a and the gripping threads 204 of nut member 202 assures that the engaging flanks 210 of threads 204 will be spaced from lock groove flanks 66 whereby the axial distance fd will be substantially maintained in response to the axial load for pull out of the gap between the workpieces.

Thus, the construction of the present invention will provide a fastening system including a fastener having desired tensile and fatigue characteristics relative to conventional swage type fasteners while being installed at substantially reduced loads permitting the use of significantly lighter weight installation tools. At the same time, this construction will also provide a desirably high level of retained preload in the fastened joint. In addition, as noted, while examples of fasteners of the present invention are defined with reference to certain specific sizes, i.e. nominal diameters, the concepts can be readily extended to fasteners over a wide range of nominal diameters.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system including a two piece fastener for securing a plurality of workpieces together and an installation tool for installing the fastener and with the fastener including a pin member and a tubular collar and with said collar having a generally straight collar shank adapted to be swaged into lock grooves on said pin member in response to a relative axial force or swage load applied between said pin member and said collar by said installation tool and providing a desired magnitude of clamp load on the workpieces in response to a predetermined magnitude of swage load, said pin member having an elongated pin shank adapted to be located in aligned openings in the workpieces and terminating at one end in an enlarged head adapted to engage a surface on one side of the workpieces and at its opposite end in a grooved portion adapted to extend past an opposite surface on the opposite side of the workpieces, said grooved portion comprising a locking portion having a plurality of said lock grooves defined by circumferentially extending pin grooves and associated pin shoulders terminating in pin crests, said pin grooves being wide and having an effective width Wg relative to the effective width Wc of the crests with a ratio of Wc/Wg of no greater than around 0.30, said pin grooves having an elongated root with a generally smooth contour, said collar shank adapted to be swaged into said lock grooves whereby the workpieces are fastened together to define the fastened joint, said collar when swaged having collar grooves and shoulders interlocking said pin grooves and shoulders, said installation tool having an anvil member with a swage cavity having an effective throat swage portion adapted to overengage said collar shank to thereby swage it radially inwardly into said lock grooves, said collar shank having a predetermined volume of material which is generally greater than the available volume defined by said effective throat swage portion and the confronting portion of said lock grooves into which said collar shank is swaged and with the material of said collar shank not fully engaging said root during swage and thus not completely filling said lock grooves after swage, said collar shank being of sufficient length to provide a predetermined number of said collar shoulders engaged with a corresponding number of said pin crests, said collar shank having a through bore having a bore diameter relative to the crest diameter of said pin crests for providing a minimal clearance prior to swage whereby the relative axial force for swage is minimized.

2. The fastening system of claim 1 with said minimal clearance providing a radial clearance Rc relative to said crest diameter Du of said crests of 2 Rc/Du×$10^2$ between around 1.0 to around 4.0 for said pin members of said fastener varying in nominal diameter from around ½ inch to around ¾ inch.

3. The fastening system of claim 1 with the number of said pin crests varying from between 7 to around 14 per inch for said pin members of said fastener varying in nominal diameter from around ½ inch to around ¾ inch.

4. The fastening system of claim 1 with said pin member being made of a ferrous material having an ultimate tensile strength of at least around 120 KSI and with said collar being made of a ferrous material having an ultimate tensile strength of at least around 60 KSI.

5. The fastening system of claim 1 with the number of said pin crests varying from between 7 to around 14 per inch for said pin members of said fastener varying in nominal diameter from around ½ inch to around ¾ inch, said pin member being made of a ferrous material having an ultimate tensile strength of at least around 120 KSI and with said collar being made of a ferrous material having an ultimate tensile strength of at least around 60 KSI.

6. The fastening system of claim 1 with said collar shank, said lock grooves and said swage cavity providing a final clamp load on the workpieces which is around 160% of the swage load.

7. The fastening system of claim 1 with said minimal clearance providing a radial clearance Rc relative to said crest diameter Du of said pin crests of 2 Rc/Du×10² between around 1.0 to around 4.0 and with the number of said pin crests varying from between 7 to around 14 per inch for said pin member of said fastener varying in nominal diameter from around ½ inch to around ¾ inch.

8. The fastening system of claim 1 with the number of said pin crests varying from between 7 to around 14 per inch for said pin member of said fastener and said minimal clearance providing a radial clearance Rc relative to said crest diameter Du of said pin crests of 2 Rc/Du×10² between around 2.5 to around 3.8 for said pin member of said fastener varying in nominal diameter from around ½ inch to around ¾ inch, said pin member being made of a ferrous material having an ultimate tensile strength of at least around 120 KSI and with said collar being made of a ferrous material having an ultimate tensile strength of at least around 60 KSI.

9. The fastening system of claim 1 with said grooved portion of said pin shank terminating at said opposite end in a pull portion connected to said locking portion by a breakneck groove, said breakneck groove defining the weakest section of said grooved portion and adapted to fracture at a relative axial force greater than the swage load, said pull portion having a plurality of pull grooves defined by pull crests and pull grooves adapted to be gripped by teeth of jaws of said installation tool, said pull crest diameter being between around 70% to around 80% of the diameter of said lock groove crests for said pin member varying in nominal diameter from around ½ inch to around ¾ inch.

10. The fastening system of claim 1 with said collar shank having a straight shank portion terminating at its outer end in a radially outwardly flared shank portion, said flared shank portion being generally of a uniform wall thickness generally the same as the wall thickness of said straight shank portion, said flared shank portion having its radially inner and outer surfaces tapered with said inner surface tapered at a greater angle relative to the axis of said pin member than said outer surface.

11. The fastening system of claim 10 with said radially inner surface tapering at an angle of around 15° and said outer surface tapering at an angle of around 5°.

12. The fastening system of claim 1 with said pin crests having an effective width Wc of the crests relative to the effective width Wg of the pin grooves with a ratio of Wc/Wg of between around 0.150 to around 0.30 for said pin member of said fastener varying in nominal diameter from around ½ inch to around ¾ inch.

13. In a fastening system including a two piece fastener for securing a plurality of workpieces together and an installation tool for installing the fastener and with the fastening system including a pin member and a collar and with said collar having a generally straight collar shank adapted to be swaged into lock grooves on said pin member in response to a relative axial force or swage load applied between said pin member and said collar by said installation tool and providing a desired magnitude of clamp load on the workpieces in response to a predetermined magnitude of swage load, said pin member being made of a ferrous material and having an elongated shank located in aligned openings in the workpieces and terminating in one end in an enlarged head and at its opposite end in a grooved portion comprising a locking portion having a plurality of circumferentially extending lock grooves defined by pin grooves and associated pin shoulders terminating in pin crests, said pin grooves having an effective width substantially greater than the effective width of said crests, said collar being made of a ferrous material and with said collar shank adapted to be swaged into said pin grooves whereby the workpieces are fastened together to define the fastened joint, said installation tool having a swage anvil member having a swage cavity with an effective throat swage portion adapted to overengage said collar shank to swage said collar shank into said lock grooves, said collar shank having a predetermined volume of material which is greater than the available volume defined by said effective throat swage portion and the confronting portion of said lock grooves into which said collar shank is swaged, said swage cavity having an outer end having a radially outwardly extending arcuate contour for initial engagement with said collar shank, said swage cavity having an axially straight portion of relatively short length connected to said radially outer end and defining the minimum diameter of said swage cavity for providing the full swage of said collar shank, said swage cavity having a tapered relief portion extending rearwardly from said straight portion and tapering radially outwardly at a relatively small angle relative to the central axis of said swage cavity whereby removal of said swage anvil from said collar shank after swage is facilitated with there being a distribution of the engagement of the material of said collar shank after spring back from swage by said straight portion and said tapered relief portion.

14. The fastening system of claim 13 with said tapered relief portion tapering at an angle of around 5° relative to the axis of said swage cavity.

15. In a fastening system including a two piece fastener, for securing a plurality of workpieces together with the fastening system including a pin member and a collar and with said collar having a generally straight collar shank adapted to be swaged into lock grooves on said pin member in response to relative axial force or swage load applied between said pin member and said collar by an installation tool and providing a desired magnitude of clamp load on the workpieces in response to a predetermined magnitude of swage load, said fastener comprising:

an elongated pin shank located in aligned openings in the workpieces and terminating in one end in an enlarged head and at its opposite end in a grooved portion comprising a plurality of said lock grooves defined by circumferentially extending pin grooves and associated pin shoulders terminating in pin crests, said pin grooves being wide and having a radial depth defined by the relationship of: $(h/Du) \times 10^2$, where h is said radial depth and Du is the diameter as defined by said pin crests and with said depth h selected relative to said shoulder diameter Du to provide a result to said relationship of no greater than around 4, said pin grooves being substantially wider than said pin shoulders, said pin grooves having a smooth root contour, said lock grooves adapted to have said collar shank swaged therein whereby the workpieces are fastened together to define the fastened joint, said pin member being of a different material and having an ultimate shear strength of a different magnitude from that of said collar with the ratio of the shear strength of said pin member to said collar being such that crushing of said pin member in swage is substantially avoided, said collar shank having a through bore with a bore diameter relative to the crest diameter of said pin crests for providing a minimal clearance prior to swage whereby the relative axial force for swage is minimized, said minimal clearance providing a radial clearance Rc relative to said crest diameter Du of said crests of 2 $Rc/Du \times 10^2$ between around 1.0 to around 4.0 for said pin members of said fastener varying in nominal diameter from around ½ inch to around ¾ inch, the number of said pin crests varying from between around 7 to around 14 per inch for said pin members of said fastener varying in nominal diameter from around ½ inch to around ¾ inch, said pin member being made of a ferrous material having an ultimate tensile strength of at least around 120 KSI and with said collar being made of a ferrous material having an ultimate tensile strength of at least around 60 KSI, said fastener providing a final clamp load which is around 160% of said swage load.

16. The fastening system of claim 15 with said collar shank having a straight shank portion terminating at its outer end in a radially outwardly flared shank portion, said flared shank portion being generally of a uniform wall thickness generally the same as the wall thickness of said straight shank portion, said flared shank portion having its radially inner and outer surfaces tapered with said inner surface tapered at a greater angle relative to the axis of said pin member than said outer surface, said radially inner surface tapering at an angle of around 15° and said outer surface tapering at an angle of around 5°.

17. In a fastening system including a two piece fastener for securing a plurality of workpieces together and an installation tool for installing the fastener and with the fastener including a pin member and a collar and with said collar having a collar shank adapted to be swaged into lock grooves on said pin member in response to relative axial force or swage load applied between said pin member and said collar by said installation tool and providing a desired magnitude of clamp load on the workpieces in response to a predetermined magnitude of swage load, the method comprising:

forming said pin member to have an elongated shank adapted to be located in aligned openings in the workpieces and terminating in one end in an enlarged head and at its opposite end in a grooved portion comprising a plurality of said lock grooves defined by circumferentially extending pin grooves and associated pin shoulders terminating in pin crests, forming said pin grooves to be wide and to have a radial depth defined by the relationship of: $(h/Du) \times 10^2$, where h is said radial depth and Du is the diameter as defined by said pin crests and with said depth h selected relative to said crest diameter Du to provide a result to said relationship of no greater than around 4, forming said pin grooves to have a wide, smooth root contour, forming a tubular collar, providing said installation tool with a swage anvil having an effective throat swage portion, swaging said collar shank into said lock grooves by said effective throat swage portion of said swage anvil whereby the workpieces are fastened together to define the fastened joint, said collar shank being selected to be of sufficient length to provide a predetermined number of said collar shoulders engaged with a corresponding number of said pin shoulders to have a combined ultimate shear strength.

18. The fastening system of claim 17 with the method further including forming said pin grooves to be wide and having an effective width Wg relative to the effective width Wc of the crests with a ratio of Wc/Wg of no greater than around 0.30, said predetermined volume of material of said collar shank not fully engaging said root during swage and thus not completely filling said lock grooves after swage, said collar shank being formed with a sufficient length to provide a predetermined number of said collar shoulders engaged with a corresponding number of said pin crests, said collar shank being formed with a through bore having a bore diameter relative to the crest diameter of said pin crests for providing a minimal clearance prior to swage whereby the relative axial force for swage is minimized.

19. In a fastening system including a two piece fastener, for securing a plurality of workpieces together and an installation tool for installing the fastener and with the fastener including a pin member and a collar and with said collar adapted to be swaged into lock grooves on said pin member in response to relative axial force or swage load applied between said pin member and said collar by the installation tool and providing a desired magnitude of clamp load on the workpieces in response to a predetermined magnitude of swage load, the method comprising:

forming said pin member to have an elongated shank adapted to be located in aligned openings in the workpieces and terminating in one end in an enlarged head and at its opposite end in a grooved portion comprising said lock grooves defined by a plurality of circumferentially extending pin grooves and associated pin shoulders terminating in pin crests, forming said pin grooves to be wide and to have a radial depth defined by the relationship of: $(h/Du) \times 10^2$, where h is said radial depth and Du is the diameter as defined by said pin crests an with said depth h selected relative to said shoulde diameter Du to provide a result to said relationship of n greater than around 4, forming said pin grooves to have wide, smooth root contour, forming said collar to have generally straight collar shank, providing said installation tool with a swage anvi having an effective throat swage portion, swaging said collar shank into said lock grooves by said effective throat swage portion of said swage anvil whereby the workpieces are fastened together to define the fastened joint, said collar shank as swaged having collar grooves and shoulders interlocking said pin grooves and shoulders, selecting said collar shank to have a predetermined volume of material which is greater than the available volume defined by said effective throat swage portion anc the confronting portion of said lock grooves into which said collar is swaged, forming said collar shank to have a through bore providing a minimal radial clearance Rc relative to said crest diameter of said pin crests of 2 RC/Du×10² between around 1.0 to around 4.0.

20. The method of claim 19 including selecting the number of said pin crests varying from between 7 to around 14 per inch for said pin member of said fastener and said minimal clearance providing a radial clearance Rc relative to said crest diameter Du of said pin crests of 2 Rc/Du×10² between around 2.5 to around 3.8 for said pin member of said fastener varying in nominal diameter from around ½ inch to around ¾ inch, forming said pin member of a ferrous material having an ultimate tensile strength of at least around 120 KSI and forming said collar of a ferrous material having an ultimate tensile strength of at least around 60 KSI.

21. In a fastening system including a two piece fastener, for securing a plurality of workpieces together and an installation tool for installing the fastener and with the fastener including a pin member and a collar and with said collar having a collar shank adapted to be swaged into lock grooves on said pin member in response to relative axial force or swage load applied between said pin member and said collar by the installation tool and providing a desired magnitude of clamp load on the workpieces in response to a predetermined magnitude of swage load, the method comprising:

forming said pin member to have an elongated shank adapted to be located in aligned openings in the workpieces and terminating in one end in an enlarged head and at its opposite end in a grooved portion comprising said lock grooves defined by a plurality of circumferentially extending pin grooves and associated pin shoulders terminating in pin crests, forming said pin grooves to be wide and to have a radial depth defined by the relationship of: (h/Du)×10², where h is said radial depth and Du is the diameter as defined by said pin crests and with said depth h selected relative to said crest diameter Du to provide a result to said relationship of no greater than around 4, forming said collar with said collar shank being generally straight, providing said installation tool with a swage anvil having an effective throat swage portion, swaging said collar shank into said lock grooves by said effective throat swage portion of said swaqe anvil whereby the workpieces are fastened together to define the fastened joint, said collar shank as swaged having collar grooves and shoulders interlocking said pin grooves and shoulders, selecting said collar shank to have a predetermined volume of material which is greater than the available volume defined by said effective throat swage portion and the confronting portion of said lock grooves into which said collar shank is swaged, providing said swage cavity with an outer end having a radially outwardly extending arcuate contour for initial engagement with said collar shank, providing said swage cavity with an axially straight portion of relatively short length connected to said radially outer end and defining the minimum diameter of said swage cavity for providing the full swage of said collar shank, providing said swage cavity with a tapered relief portion extending rearwardly from said straight portion and tapering radially outwardly at a relatively small angle relative to the central axis of said swage cavity whereby removal of said swage anvil from said collar shank after swage is facilitated with there being a distribution of the engagement of the material of said collar shank after spring back from swage by said straight portion and said tapered relief portion.

22. In a fastening system including a two piece fastener, for securing a plurality of workpieces together and an installation tool for installing the fastener and with the fastener including a pin member and a collar and with said collar having a collar shank adapted to be swaged into lock grooves on said pin member in response to a relative axial force or swage load applied between said pin member and said collar by said installation tool and providing a desired magnitude of clamp load on the workpieces in response to a predetermined magnitude of swage load, the method comprising:

forming said pin member to have an elongated shank adapted to be located in aligned openings in the workpieces and terminating in one end in an enlarged head and at its opposite end in a grooved portion comprising said lock grooves defined by a plurality of circumferentially extending pin grooves and associated pin shoulders terminating in pin crests, forming said pin grooves to be wide and to have a radial depth defined by the relationship of: (h/Du)×10², where h is said radial depth and Du is the diameter as defined by said pin crests and with said depth h selected relative to said crest diameter Du to provide a result to said relationship of no greater than around 4, forming said collar with said collar shank, providing said installation tool with a swage anvil having an effective throat swage portion, swaging said collar shank into said lock grooves by said effective throat swage portion of said swage anvil whereby the workpieces are fastened together to define the fastened joint, said collar shank as swaged having collar grooves and shoulders interlocking said pin grooves and shoulders, selecting said collar shank to have a predetermined volume of mater ial which is greater than the available volume defined by said effective throat swage portion and the confronting portion of said pin grooves into which said collar shank is swaged, said pin member and said collar being constructed of ferrous materials and generally having a relationship to provide the following in inches:

| NOM. DIA. | Pin Crest Diameter Du | Depth of Grooves h | Collar O.D. Before Swage Dc | Collar I.D. Before Swage ID | Anvil Throat Diameter Da | Pin Lock Groove Root Diameter Dr | Pitch P |
|---|---|---|---|---|---|---|---|
| ½ | .497 | .016 | .794 | .514 | .753 | .465 | .076 |
| ⅝ | .622 | .0205 | .990 | .643 | .939 | .581 | .091 |
| ¾ | .747 | .024 | 1.187 | .771 | 1.125 | .699 | .097 |

23. In a fastening system including a two piece fastener, for securing a plurality of workpieces together and an installation tool for installing the fastener and with the fastener including a pin member and a collar and with said collar having a collar shank adapted to be swaged into lock grooves on said pin member in response to relative axial force or swage load applied between said pin member and said collar by said installation tool and providing a desired magnitude of clamp load on the workpieces in response to a predetermined magnitude of swage load, the method comprising:

forming said pin member to have an elongated shank adapted to be located in aligned openings in the workpieces and terminating in one end in an enlarged head and at its opposite end in a grooved portion comprising said lock grooves defined by a plurality of circumferentially extending pin grooves and associated pin shoulders terminating in pin crests, forming said pin grooves to be wide and to have a radial depth defined by the relationship of: $(h/Du) \times 10^2$, where h is said radial depth and Du is the diameter as defined by said pin shoulders and with said depth h selected relative to said shoulder diameter Du to provide a result to said relationship of no greater than around 4, forming said pin grooves to have a smooth, wide root contour being generally defined by a continuous curve, forming said collar with said collar shank being generally straight, providing said installation tool with a swage anvil having an effective throat swage portion, swaging said collar shank of said collar into said lock grooves by said effective throat swage portion of said swage anvil whereby the workpieces are fastened together to define the fastened joint, said collar shank as swaged having collar grooves and shoulders interlocking said pin grooves and shoulders, forming said pin grooves to be wide and having an effective width Wg relative to the effective width Wc of the crests with a ratio of Wc/Wg of no greater than around 0.30, forming said pin grooves to have an elongated root with a generally smooth contour, forming said collar shank to have a predetermined volume of material which is generally greater than the available volume defined by said effective throat swage portion and the confronting portion of said lock grooves into which said collar shank is swaged and with the material of said collar shank not fully engaging said root during swage and thus not completely filling said lock grooves after swage, forming said collar shank to be of sufficient length to provide a predetermined number of said collar shoulders engaged with a corresponding number of said pin crests to have a combined preselected ultimate shear strength, said collar shank selected to have a through bore having a bore diameter relative to the crest diameter of said pin crests for providing a minimal clearance prior to swage whereby the relative axial force for swage is minimized, selecting said minimal clearance to provide a radial clearance Rc relative to said crest diameter Du of said crests of $2\, Rc/Du \times 10^2$ between around 1.0 to around 4.0 for said pin members of said fastener varying in nominal diameter from around ½ inch to around ¾ inch, selecting said pin crests to vary from between 7 to around 14 per inch for said pin members of said fastener varying in nominal diameter from around ½ inch to around ¾ inch, forming said pin member of a ferrous material having an ultimate tensile strength of at least around 120 KSI and with said collar being made of a ferrous material having an ultimate tensile strength of at least around 60 KSI.

24. In a fastening system including a two piece fastener, for securing a plurality of workpieces together and an installation tool for installing the fastener and with the fastener including a pin member and a collar and with said collar having a collar shank adapted to be swaged into lock grooves on said pin member in response to a relative axial force or swage load applied between said pin member and said collar by said installation tool having a swage anvil and providing a desired magnitude of clamp load on the workpieces in response to a predetermined magnitude of swage load, said pin member having an elongated shank adapted to be located in aligned openings in the workpieces and terminating at one end in an enlarged head and at its opposite end in a grooved portion comprising a plurality of said lock grooves defined by circumferentially extending pin grooves and associated pin shoulders terminating in pin crests, said pin crests having a predetermined crest diameter, said pin grooves being substantially wider than said pin crests and having a root with a generally simulated streamlined contour, said swage anvil having an effective throat swage portion adapted to overengage and swage said collar shank into said lock grooves, said collar being generally tubular with said collar shank being generally straight and adapted to be swaged into said lock grooves by said effective throat swage portion of said swage cavity whereby the workpieces are fastened together to define the fastened joint, said swaged collar shank having collar grooves and shoulders interlocking said pin grooves and shoulders, said collar shank having a predetermined volume of material which is greater than the available volume defined by said effective throat swage portion and the confronting portion of said lock grooves into which said collar shank is swaged and with the volume of material of said collar shank selected such that it does not engage said roots during swage and thus does not completely fill said lock grooves after swage, said collar shank being of sufficient length to provide a predetermined number of said collar shoulders engaged with a corresponding number of said pin crests, said collar shank having an inside diameter relative to the diameter of said pin crests providing minimal clearance whereby the relative axial force for swage is minimized, said crests having an effective width Wc relative to an effective width Wg of said lock grooves with the width Wc being substantially less than width Wg whereby said crests are substantially spaced apart, said collar shank having a through bore with a bore diameter providing said minimal clearance, said minimal clearance providing a radial clearance Rc relative to the diameter Du of said crests of 2 Rc/Du×10$^2$ between around 3.0 to around 4.0 for said pin members of said fastener varying in nominal diameter from around ½ inch to around ¾ inch.

25. The fastening system of claim 24 with said lock grooves being helically shaped.

26. The fastening system of claim 24 with the number of said pin crests varying from between around 7 to around 14 per inch for said pin members of said fastener varying in nominal diameter from ½ inch to around ¾ inch.

27. The fastening system of claim 24 with the ratio of the effective crest width Wc to the effective groove width Wg of said lock grooves being between around 0.20 to around 0.28.

28. The fastening system of claim 24 with said shank of said pin member having a lock portion including said lock grooves and terminating in a pull portion having a plurality of pull grooves adapted to be gripped by gripping jaws of the installation tool, said pull portion connected to said lock portion by a breakneck groove adapted to fracture at a relative axial force greater than said swage load, said pull grooves having crests being of a diameter of between around 70% to around 85% of said crest diameter of said lock grooves.

29. The fastening system of claim 24 with said collar shank having a straight shank portion terminating at its outer end in a radially outwardly flared shank portion, said flared shank portion being generally of a uniform wall thickness generally the same as the wall thickness of said straight shank portion, said flared shank portion having its radially inner and outer surfaces tapered with said inner surface tapered at a greater angle relative to the axis of said pin member than said outer surface.

30. The fastening system of claim 24 with said radially inner surface tapering at an angle of around 15° while said outer surface tapers at an angle of around 5°.

31. The fastening system of claim 24 with said pin member and said collar being constructed of ferrous materials and generally having a relationship to provide the following in inches:

| NOM. DIA. | Pin Crest Diameter Du | Depth of Grooves h | Collar O.D. Before Swage Dc | Collar I.D. Before Swage ID | Anvil Throat Diameter Da | Pin Lock Groove Root Diameter Dr | Pitch P |
|---|---|---|---|---|---|---|---|
| 1/2 | .497 | .016 | .794 | .514 | .753 | .465 | .076 |
| 5/8 | .622 | .0205 | .990 | .643 | .939 | .581 | .091 |
| 3/4 | .747 | .024 | 1.187 | .771 | 1.125 | .699 | .097 |

32. The fastening system of claim 24 with an example of said pin member and said collar being constructed of ferrous materials and generally having a relationship to provide the following in inches:

| NOM. DIA. | Pin Crest Diameter Du | Depth of Grooves h | Collar O.D. Before Swage Dc | Collar I.D. Before Swage ID | Anvil Throat Diameter Da | Pin Lock Groove Root Diameter Dr | Pitch P |
|---|---|---|---|---|---|---|---|
| 5/8 | .622 | .027 | .990 | .643 | .939 | .568 | .130 | and with the ratio of Wc/Wg being around 0.204 and having around 8 crests per inch.

33. The fastening system of claim 24 with an example of said pin member and said collar being constructed of ferrous materials and generally having a relationship to provide the following in inches:

| NOM. DIA. | Pin Crest Diameter Du | Depth of Grooves h | Collar O.D. Before Swage Dc | Collar I.D. Before Swage ID | Anvil Throat Diameter Da | Pin Lock Groove Root Diameter Dr | Pitch P |
|---|---|---|---|---|---|---|---|
| 5/8 | .622 | .020 | .990 | .643 | .939 | .581 | .130 | and with the ratio Wc/Wg being around 0.162 and having around 8 crests per inch.

34. The fastening system of claim 24 with an example of said pin member and said collar being constructed of ferrous materials and generally having a relationship to provide the following in inches:

| NOM. DIA. | Pin Crest Diameter Du | Depth of Grooves h | Collar O.D. Before Swage Dc | Collar I.D. Before Swage ID | Anvil Throat Diameter Da | Pin Lock Groove Root Diameter Dr | Pitch P |
|---|---|---|---|---|---|---|---|
| 5/8 | .622 | .027 | .990 | .643 | .939 | .568 | .130 | and with the ratio of Wc/Wg being around 0.204 and having around 8 crests per inch, said lock grooves being helically shaped and adapted to be threadably gripped by a nut member of the installation tool for applying the relative axial force between said pin member and said collar.

35. The fastening system of claim 24 with an example of said pin member and said collar being constructed of ferrous materials and generally having a relationship to provide the following in inches:

| NOM. DIA. | Pin Crest Diameter Du | Depth of Grooves h | Collar O.D. Before Swage Dc | Collar I.D. Before Swage ID | Anvil Throat Diameter Da | Pin Lock Groove Root Diameter Dr | Pitch P |
|---|---|---|---|---|---|---|---|
| 5/8 | .622 | .020 | .990 | .643 | .939 | .581 | .130 | and with the ratio Wc/Wg being around 0.162 and having around 8 crests per inch, said pin member having an internal bore at the end of said shank opposite said pin head with said internal bore being threaded and adapted to be threadably engaged by a threaded spindle member of the installation tool for applying the relative axial force between said pin member and said collar.

36. In a fastening system including a two piece fastener, for securing a plurality of workpieces together and an installation tool for installing the fastener and with the fastening system including a pin member and a collar and with said collar having a collar shank adapted to be swaged into lock grooves on said pin member in response to a relative axial force or swage load applied between said pin member and said collar by said installation tool and providing a desired magnitude of clamp load on the workpieces in response to a predetermined magnitude of swage load, said pin member having an elongated pin shank adapted to be located in aligned openings in the workpieces and terminating at one end in an enlarged head adapted to engage a surface on one side of the workpieces and at its opposite end in a grooved portion adapted to extend past an opposite surface on the opposite side of the workpieces, said grooved portion comprising a locking and pull portion having a plurality of said lock and pull grooves defined by helically extending pin grooves and associated pin shoulders terminating in pin crests, said pin crests being uniformly spaced at a preselected pitch, said pin grooves being wide and having an effective width Wg relative to the effective width Wc of the crests with a ratio of Wc/Wg of no greater than around 0.20, said pin grooves having an elongated root with a generally smooth contour, a tubular collar having a generally straight shank adapted to be swaged into said lock and pull grooves whereby the workpieces are fastened together to define the fastened joint, said collar shank when swaged having collar grooves and shoulders interlocking said pin grooves and shoulders, said installation tool adapted to apply a relative axial force between said pin member and said collar for attaining the swage load and having an anvil member with a swage cavity having an effective throat swage portion adapted to overengage said collar shank of said collar to thereby swage it radially inwardly into said lock and pull grooves, said installation tool having a threaded pull nut member adapted to threadably engage said lock and pull grooves in applying the relative axial force, said collar shank having a predetermined volume of material which is generally greater than the available volume defined by said effective throat swage portion and the confronting portion of said lock and pull grooves into which said collar shank is swaged and with the material of said collar shank not fully engaging said root during swage and thus not completely filling said lock and pull grooves after swage, said collar shank being of sufficient length to provide a predetermined number of said collar shoulders engaged with a corresponding number of said pin crests, said collar shank having a through bore having a bore diameter relative to the crest diameter of said pin crests for providing a minimal clearance prior to swage whereby the relative axial force for swage is minimized, said root having a maximum depth at a point spaced from the adjacent crest and adjacent a trailing pin shoulder of around 1/3 of said pitch, said adjacent pin shoulder defining a trailing flank extending generally linearly at a preselected angle relative to the axis of said pin member, said root connected to said trailing flank by an angulated portion defining a preselected shear plane located at a point having a depth axially spaced from said trailing flank, said pull nut member having threads with nut flanks adapted to engage said trailing flanks of said pin shoulder with said nut threads having crests of a preselected length to initially engage said root at said shear plane whereby said nut flanks are axially spaced from said trailing flanks, said shear plane located at around 80% of the maximum depth of said root whereby engagement of said nut flanks with said trailing flanks is prevented until a preselected axial load is reached.

37. The fastening system of claim 36 with an example of said pin member and said collar being constructed of ferrous materials and generally having a relationship to provide the following in inches:

| NOM. DIA. | Pin Crest Diameter Du | Depth of Grooves h | Collar O.D. Before Swage Dc | Collar I.D. Before Swage ID | Anvil Throat Diameter Da | Pin Lock Groove Root Diameter Dr | Pitch P |
|---|---|---|---|---|---|---|---|
| 5/8 | .622 | .027 | .9990 | .643 | .939 | .568 | .130 | and with the ratio of Wc/Wg being around 0.204 and having around 8 crests per inch.

* * * * *

UNITED STATES PATENT AND TRADEMARK OFFICE
CERTIFICATE OF CORRECTION

PATENT NO.    : 6,233,802 B1
DATED         : May 22, 2001
INVENTOR(S)   : David J. Fulbright It is certified that error appears in the above-identified patent and that said Letters Patent is hereby corrected as shown below:

Column 15,
Line 21, delete "102" and substitute therefor -- 10 --.

Column 17,
Chart of Typical Values, "Percent Fill-Swaged" insert:

|  | FASTENER 10 PRESENT INVENTION | FASTENER 110 CONVENTIONAL |
|---|---|---|
| Nom. Dia. | 1/2 inch   5/8 inch   3/4 inch | 1/2 inch   5/8 inch   3/4 inch |

Column 27,
Line 62, delete -- and 11D --.

Column 38,
Line 58, delete "shoulde" and substitute -- shoulder --.
Line 59, delete "n" and substitute therefor -- no --.
Line 62, delete "anvi" and substitute therefor -- anvil --.

Column 39,
Line 6, delete "anc" and substitute therefor -- and --.
Line 58, delete "swaque" and substitute therefor -- swage --.

Column 48,
Line 34, delete ".999" and substitute therefor -- .990 --.

Signed and Sealed this

Twenty-fourth Day of December, 2002

JAMES E. ROGAN
*Director of the United States Patent and Trademark Office*